(12) United States Patent
Mokuo et al.

(10) Patent No.: US 10,165,140 B2
(45) Date of Patent: Dec. 25, 2018

(54) MEDIUM DISCHARGING DEVICE AND IMAGE READING APPARATUS

(71) Applicant: SEIKO EPSON CORPORATION, Tokyo (JP)

(72) Inventors: Tomoyuki Mokuo, Kitakyushu (JP); Hidenori Harada, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/630,532

(22) Filed: Jun. 22, 2017

(65) Prior Publication Data

US 2018/0007221 A1    Jan. 4, 2018

(30) Foreign Application Priority Data

Jun. 30, 2016 (JP) ................. 2016-129754

(51) Int. Cl.
*H04N 1/04* (2006.01)
*H04N 1/00* (2006.01)
*B65H 31/02* (2006.01)

(52) U.S. Cl.
CPC ......... *H04N 1/00631* (2013.01); *B65H 31/02* (2013.01); *H04N 1/00591* (2013.01); *H04N 1/00602* (2013.01); *H04N 2201/0081* (2013.01)

(58) Field of Classification Search
CPC ............. H04N 1/00615; H04N 1/0066; H04N 1/0057; H04N 1/00636; H04N 2201/0094; H04N 1/00591; H04N 1/00602; H04N 1/00631; H04N 2201/0081

USPC .......... 399/361, 392, 402, 405; 358/1.3, 1.4, 358/1.8, 401, 502
See application file for complete search history.

(56) References Cited

U.S. PATENT DOCUMENTS

| | | | | |
|---|---|---|---|---|
| 4,787,616 A * | 11/1988 | Sasaki | ................... | B65H 39/11 271/176 |
| 4,949,134 A * | 8/1990 | Iwaki | ................... | G03G 15/234 271/238 |
| 4,993,697 A * | 2/1991 | Yamashita | ................ | B42C 1/12 270/58.17 |
| 5,359,357 A * | 10/1994 | Takagi | ................. | B41J 2/17513 347/49 |
| 6,025,928 A * | 2/2000 | Takemura | .................. | B41J 3/54 358/1.3 |
| 6,507,415 B1 * | 1/2003 | Toyoda | ................ | H04N 1/3876 358/450 |
| 6,895,211 B2 * | 5/2005 | Yamashita | ........... | G03G 15/231 399/388 |

(Continued)

FOREIGN PATENT DOCUMENTS

JP    2010-062839 A    3/2010

*Primary Examiner* — Negussie Worku
(74) *Attorney, Agent, or Firm* — Workman Nydegger

(57) ABSTRACT

A medium discharging device includes a discharging unit which discharges a medium; and a medium receiving tray which receives the medium discharged by the discharging unit, and is switched between an extended state and an accommodated state, in which the medium receiving tray is provided with a base tray, a main extendeding unit that is accommodated or extended, and at least one sub-extendeding unit that is accommodated or extended, and in which the base tray forms an accommodating space for accommodating at least the one sub-extendeding unit, and is provided with a first protrusion portion protruding toward the accommodating space.

9 Claims, 26 Drawing Sheets

(56) References Cited

U.S. PATENT DOCUMENTS

| | | | |
|---|---|---|---|
| 7,427,116 B2* | 9/2008 | Nakamura | B41J 25/308 347/22 |
| 7,547,091 B2* | 6/2009 | Hashii | B41J 19/202 347/37 |
| 9,588,477 B2* | 3/2017 | Sato | G03G 21/1857 |
| 2005/0025544 A1* | 2/2005 | Yamashita | G03G 15/231 399/401 |
| 2005/0061880 A1* | 3/2005 | Vanek | G07C 13/00 235/386 |
| 2010/0053701 A1* | 3/2010 | Yoshida | H04N 1/00525 358/474 |
| 2014/0140357 A1* | 5/2014 | Kenney | H04W 80/00 370/474 |
| 2014/0294428 A1* | 10/2014 | Iketani | G03G 21/1633 399/98 |
| 2016/0272443 A1* | 9/2016 | Seto | B65H 1/04 |
| 2018/0007221 A1* | 1/2018 | Mokuo | B65H 31/02 |

\* cited by examiner

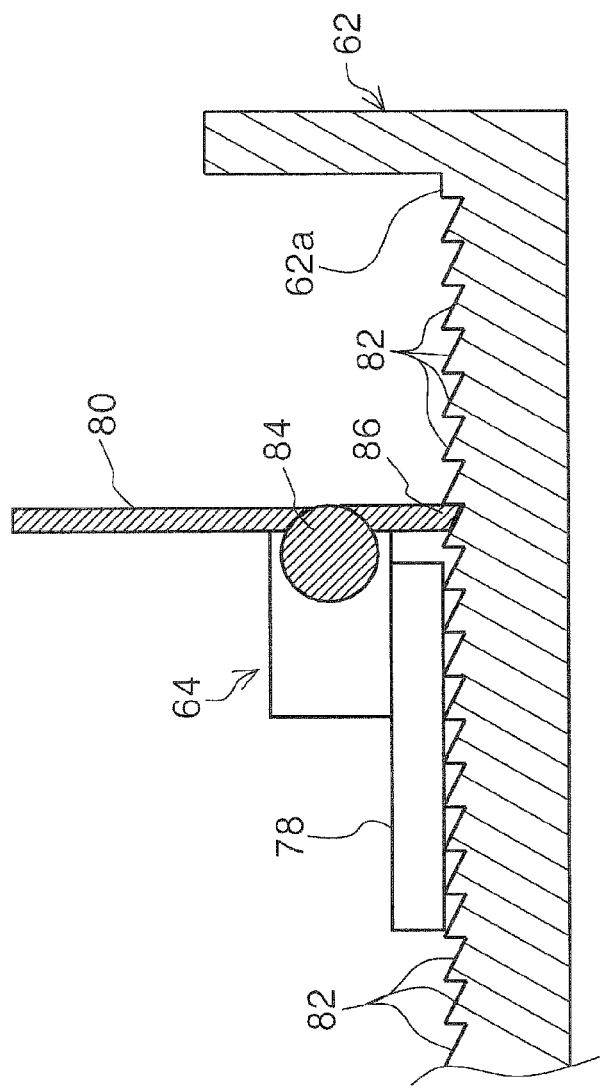
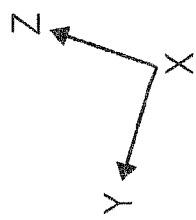

FIG. 23
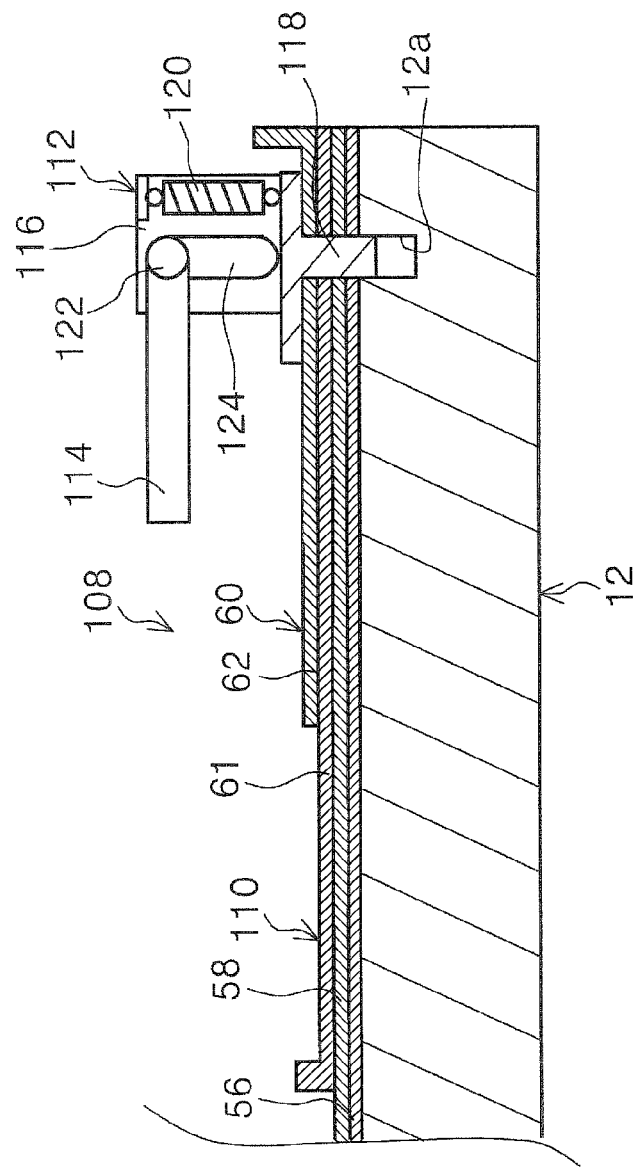
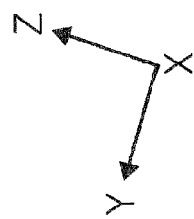

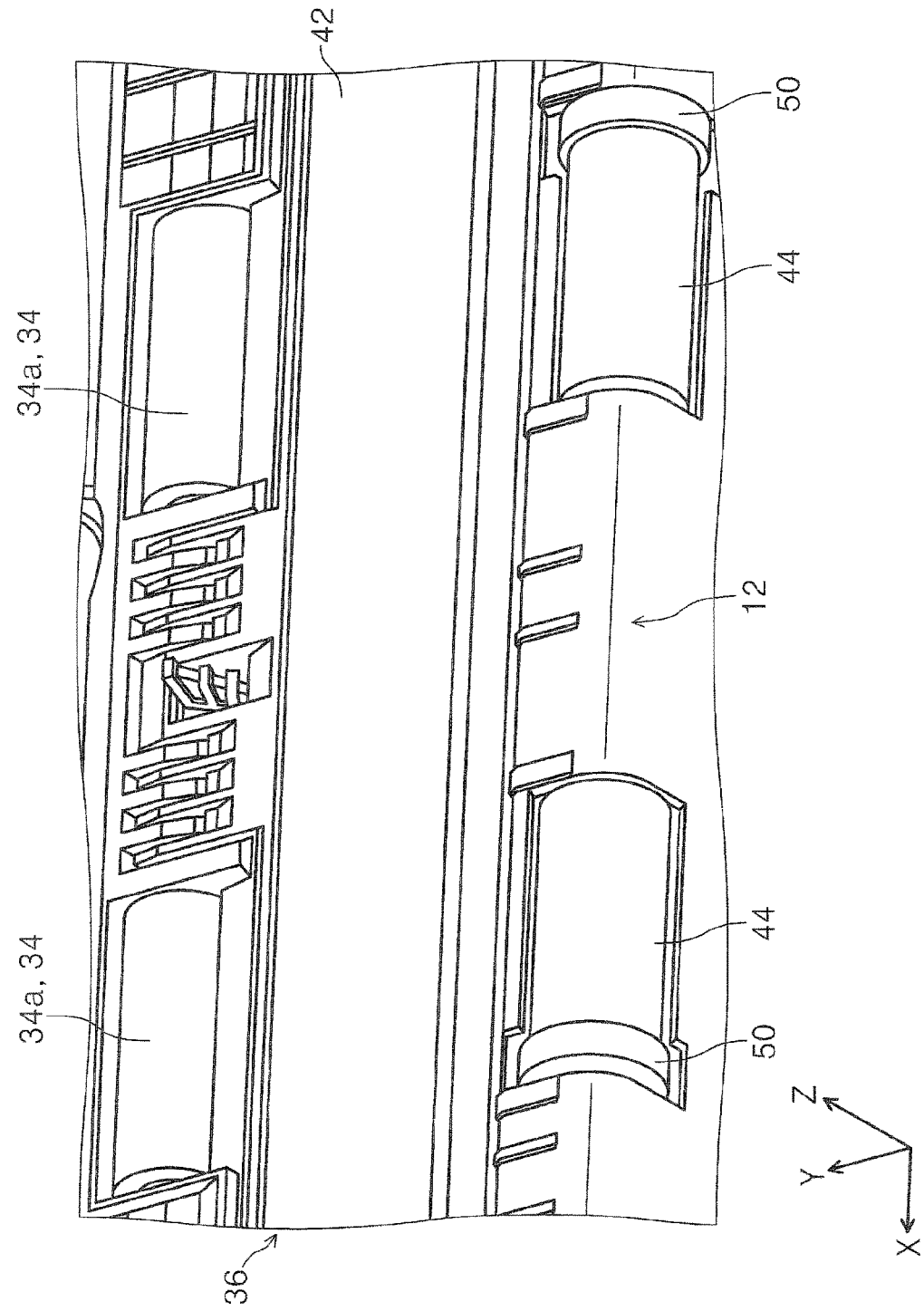

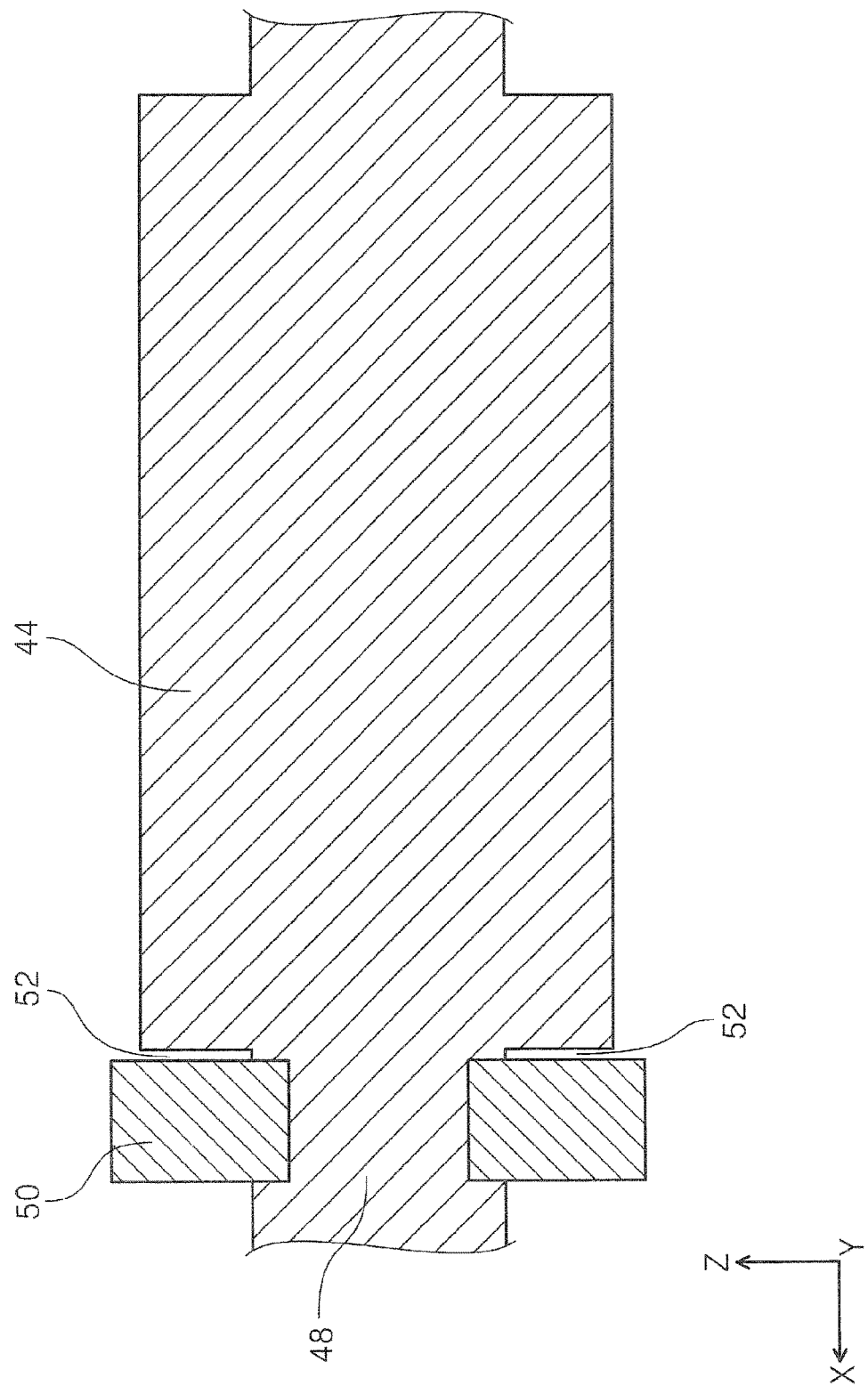

MEDIUM DISCHARGING DEVICE AND IMAGE READING APPARATUS

BACKGROUND

1. Technical Field

The present invention relates to a medium discharging device which discharges a medium, and an image reading apparatus provided with the medium discharging device.

2. Related Art

A scanner, as an example of an image reading apparatus, may be configured in which an automatic feeder of a document (also referred to as an automatic document feeder (ADF)) as a medium is provided, and in which automatic feeding and reading of a plurality of documents are performed. The plurality of transported documents are read in an image reading unit provided on the downstream side in a transport direction of the automatic feeder.

In such a scanner, there is a case in which a medium discharging device is provided so that a pair of discharging rollers is provided on the downstream side of the image reading unit, and documents are discharged to the outside of the device and are stacked up in order of discharging in a discharged paper accommodating tray (also referred to as a discharged paper stacker, or the like in some cases) which accommodates the discharged plurality of documents (for example, refer to JP-A-2010-62839).

In addition, as the discharged paper accommodating tray, a discharged paper accommodating tray is known in which an accommodated state and an extended state can be switched. For example, in a multistage discharged paper accommodating tray, a tray on a free end side (sub tray) is accommodated in a tray on a base end side (base tray), and the sub tray is pulled out from the base tray when being used, and is used by extendeding a medium receiving face.

However, an accommodating space for accommodating the sub tray is formed in the base tray, and there is a concern that a discharged medium may enter the accommodating space, or a back side of the accommodating space in a state in which the sub tray is pulled out from the base tray. In particular, in a case in which a discharged medium is a small medium of a card size, or the like, the problem of entering easily occurs. Furthermore, there is a case in which the medium receiving face is inclined upward toward the free end side, and when a small-sized medium is discharged to such an upwardly inclined face, the discharged medium tends to return to the base tray side, and the problem of entering easily occurs. Furthermore, in a case in which a stopper for preventing jumping out of a medium is provided at a tip end of the discharged paper accommodating tray, the problem of entering easily occurs since the discharged medium comes into contact with the stopper, and is bounced.

SUMMARY

An advantage of some aspects of the invention is to reliably avoid entering of a discharged medium into a tray.

According to an aspect of the invention, there is provided a medium discharging device which includes a discharging unit that discharges a medium toward a medium discharging direction in which a medium is discharged, and a medium receiving tray that receives a medium discharged by the discharging unit, and is switched between an extended state and an accommodated state, in which the medium receiving tray includes a base tray, a main extendeding unit that is located on a medium discharging direction side compared to the base tray in an extended state, and is accommodated or extended, and at least one sub-extendeding unit that is located on the medium discharging direction side, compared to the main extendeding unit in an extended state, and is accommodated or extended, and in which the base tray forms an accommodating space for accommodating at least the one sub-extendeding unit, the base tray being provided with a first protrusion portion protruding toward the accommodating space.

According to the aspect, the medium receiving tray which can be switched between the extended state and the accommodated state is provided with the base tray, the main extendeding unit, and the sub-extendeding unit, and since the accommodating space for accommodating at least one sub-extendeding unit is formed in the base tray, there is a concern that a discharged medium may enter the accommodating space, or a back side of the accommodating space when the sub-extendeding unit is extended. However, according to the aspect, since the first protrusion portion which protrudes toward the accommodating space is provided in the accommodating space in the base tray, it is possible to regulate entering of a medium into the accommodating space, or the back side of the accommodating space using the first protrusion portion.

In this case, in the first aspect, it is preferable that the main extendeding unit includes a second protrusion portion which is provided at a position facing the accommodating space, protrudes to the accommodating space, and includes a portion overlapping with the first protrusion portion in a thickness direction of the receiving tray, and the overlapping portion is maintained regardless of an extended position of the main extendeding unit.

According to the aspect, since the second protrusion portion which protrudes to the accommodating space, and includes a portion which is overlapped with the first protrusion portion in the thickness direction of the medium receiving tray is provided at the position facing the accommodating space in the main extendeding unit, and the overlapping of the first protrusion portion with the second protrusion portion is maintained regardless of the extended position of the main extendeding unit, it is possible to regulate entering of a medium into the accommodating space or the back side of the accommodating space, even in a state in which the main extendeding unit is in a half-extended state, not only in a fully extended state. In this manner, it is possible to provide a medium discharging device in which it is possible to reliably avoid entering of a medium into the accommodating space or the back side of the accommodating space.

In this case, in the second aspect, it is preferable that one of the first protrusion portion and the second protrusion portion is configured of a first rib which extends in the medium discharging direction, and the other one of the first protrusion portion and the second protrusion portion is configured of a second rib which extends in a direction intersecting the medium discharging direction.

According to the aspect, since any one of the first protrusion portion and the second protrusion portion is configured of the first rib which extends in the medium discharging direction, and the other thereof is configured of the second rib which extends in the direction which intersects the medium discharging direction, it is possible to more reliably suppress entering of a medium into the accommodating space or the back side of the accommodating space.

In this case, in the third aspect, it is preferable that the first rib includes a plurality of first ribs provided in the direction intersecting the medium discharging direction with an interval, and a maximum disposing interval between the plurality of first ribs is smaller than a size of a medium, the size of which is smallest in a medium width direction intersecting the medium discharging direction, in mediums discharged by the discharging unit.

According to the aspect, since the plurality of first ribs are provided in the direction intersecting the medium discharging direction with an appropriate interval, and the maximum disposing interval in the plurality of first ribs is smaller than the size of the medium of which the size in the medium width direction as the direction intersecting the medium discharging direction is smallest, in mediums which can be recorded by a recording unit, and can be discharged by the discharging unit, it is possible to preferably regulate entering of a medium into the accommodating space, or the back side of the accommodating space, regardless of a size of a medium.

In this case, in any one of the first to fourth aspects, it is preferable that the sub-extendeding unit includes a tip end extendeding portion located on the most tip end in the medium discharging direction in an extended state, and a stopper portion slidable with respect to the tip end extendeding portion, and is switched between a regulating posture and an accommodated posture along the medium receiving face, the regulating posture being a posture in which jumping out of a medium is regulated by the stopper portion rotating to form a face intersecting a medium receiving face.

According to the aspect, since the stopper portion which can be switched between the regulating posture in which jumping out of a medium is regulated, by forming a face which intersects the medium receiving face by rotating and the accommodated posture as a posture which goes along the medium receiving face is provided, it is possible to suppress jumping out of a medium from a medium receiving tray at a time of discharging the medium using the stopper.

In this case, in the fifth aspect, it is preferable that a plurality of recessed portions are formed in the tip end extendeding portion in a sliding direction of the stopper portion, and a protrusion portion is formed in the stopper portion, the protrusion portion entering one of the recessed portions when the stopper portion is switched from the accommodated posture to the regulating posture.

According to the aspect, since the plurality of recessed portions are formed in the tip end extendeding portion along a sliding direction of the stopper portion, and the protrusion portion which enters the recessed portion is formed in the stopper portion when the stopper portion is switched from the accommodated posture to the regulating posture, it is possible to reliably hold the stopper portion at a desired position using engaging of the recessed portion with the protrusion portion. In particular, it is possible to suppress a positional deviation of the stopper portion which occurs when a discharged medium presses the stopper portion.

In this case, in the fifth or sixth aspect, it is preferable that the medium discharging device include a switching unit switching postures of the stopper portion and a control unit controlling the switching unit, in which the control unit pushes down the stopper portion on an upstream side or a downstream side in the medium discharging direction from the regulating posture based on size information of a discharged medium, in a case in which a tip end of the discharged medium passes over a position of the stopper portion when the medium is discharged to the medium receiving tray.

According to the aspect, since the switching unit which performs switching of a posture of the stopper portion, and the control unit which controls the switching unit are provided, and the control unit pushes down the stopper portion on the upstream side or the downstream side in the medium discharging direction from the regulating posture, in a case in which the tip end of a medium which is discharged goes over a position of the stopper portion when being discharged to the medium receiving tray, based on size information of the medium which is discharged, it is possible to avoid a problem in which the stopper portion interrupts discharging of a long medium when the long medium is discharged.

In this case, in any one of the fifth to seventh aspects, it is preferable that the base tray is accommodated or extended with respect to a housing of the medium discharging device, and a locking unit is provided that locks the base tray, the main extendeding unit, and the sub-extendeding unit to an accommodated state by the stopper portion being switched from the regulating posture to the accommodated posture, and releases the locking by the stopper portion being switched from the accommodated posture to the regulating posture.

According to the aspect, since the base tray can be accommodated or extended with respect to the housing of the medium discharging device, and a locking unit which locks the base tray, the main extendeding unit, and the sub-extendeding unit to an accommodated state by switching the stopper portion from the regulating posture to the accommodated posture, and releases the locking by switching the stopper portion from the accommodated posture to the regulating posture is provided, it is possible to avoid a problem in which the medium receiving tray enters the extended state unintendedly, when carrying the device, for example. In addition, since the stopper portion performs an operation of the locking unit, it is not necessary to provide an exclusive operating member, and it is possible to suppress a rise in cost.

According to another aspect of the invention, there is provided an image reading apparatus which includes a reading unit that reads a face of a medium; and the medium discharging device according to any one of the first to eighth aspects that is provided on a downstream side of the reading unit in a medium transport direction.

According to the aspect, in the image reading apparatus, it is possible to obtain the same operational effect as that of any one of the above described first to eighth aspects.

BRIEF DESCRIPTION OF THE DRAWINGS

The invention will be described with reference to the accompanying drawings, wherein like numbers reference like elements.

FIG. 21 is a side sectional view which illustrates a slider locking structure in the modification example of the stopper portion.

FIG. 23 is a side sectional view which illustrates a locked state of a main extendeding unit and a sub-extendeding unit in a medium receiving tray in a third embodiment.

FIG. 25 is a perspective view which illustrates an image reading unit in an image reading apparatus.

FIG. 26 is a sectional view of a discharging driving roller.

DESCRIPTION OF EXEMPLARY EMBODIMENTS

Figure 1:
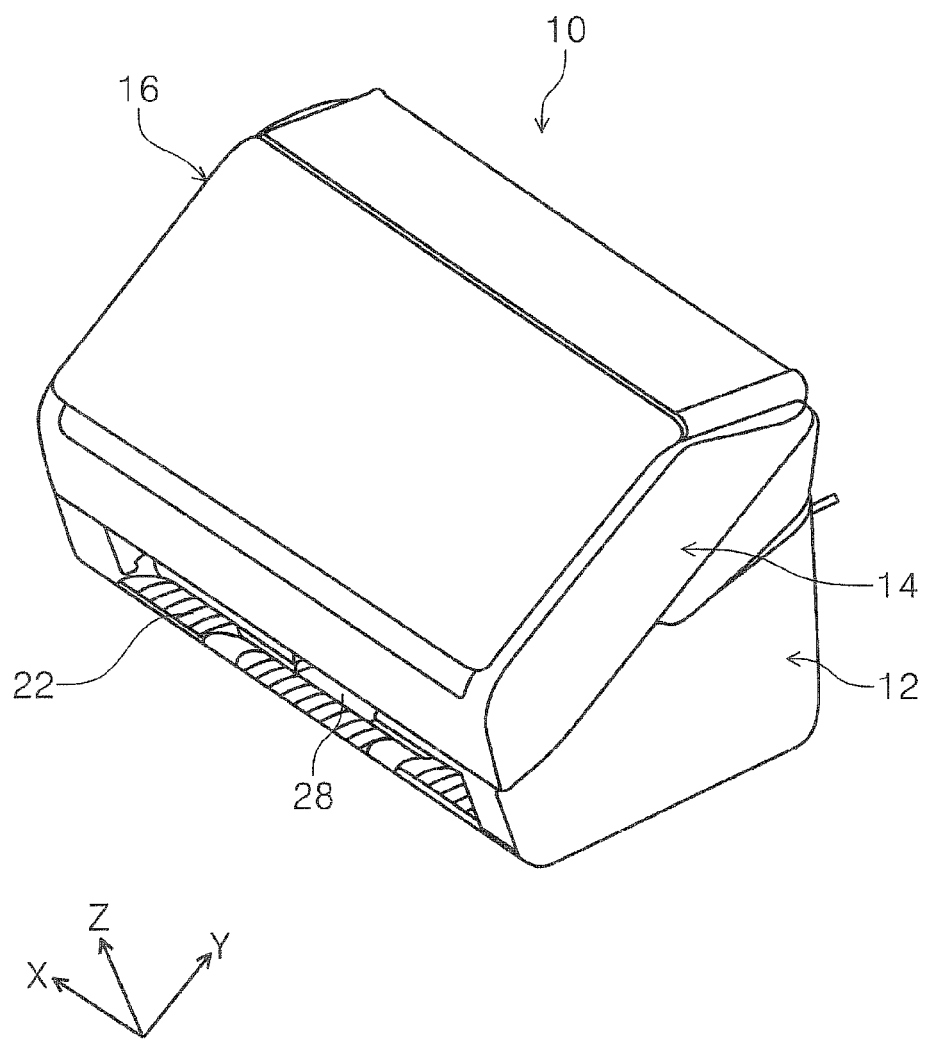
FIG. 1 is a perspective view which illustrates a non-feeding state of a medium in an image reading apparatus according to the invention.

Hereinafter, an embodiment of the invention will be described based on drawings. The same reference numerals are attached to the same configuration in each embodiment, descriptions are made only in the first embodiment, and descriptions of configurations in embodiments thereafter will be omitted.

Figure 2:
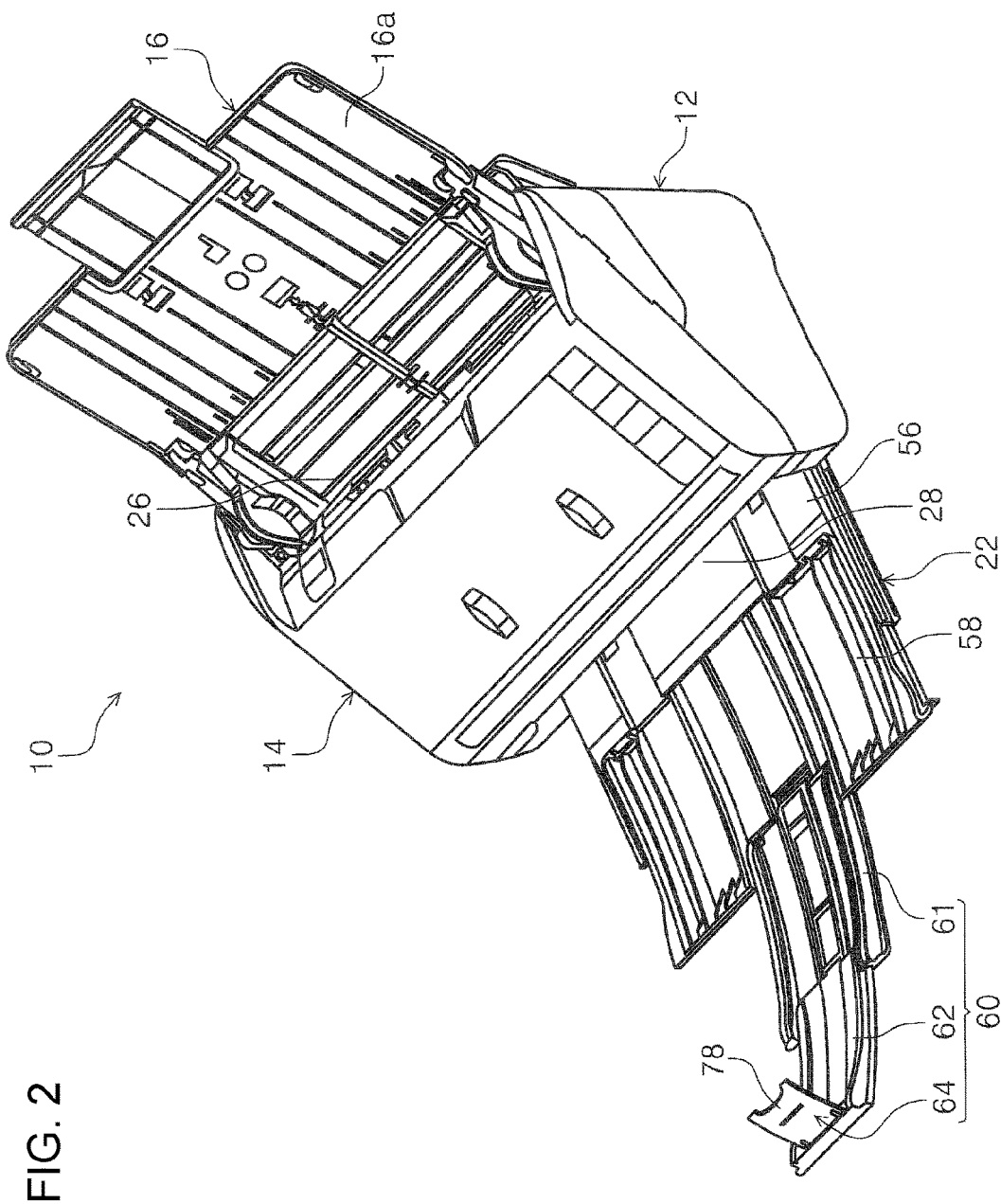
FIG. 2 is a perspective view which illustrates a state in which a cover is opened, and a medium receiving tray is extended, in the image reading apparatus according to the invention.
Figure 3:
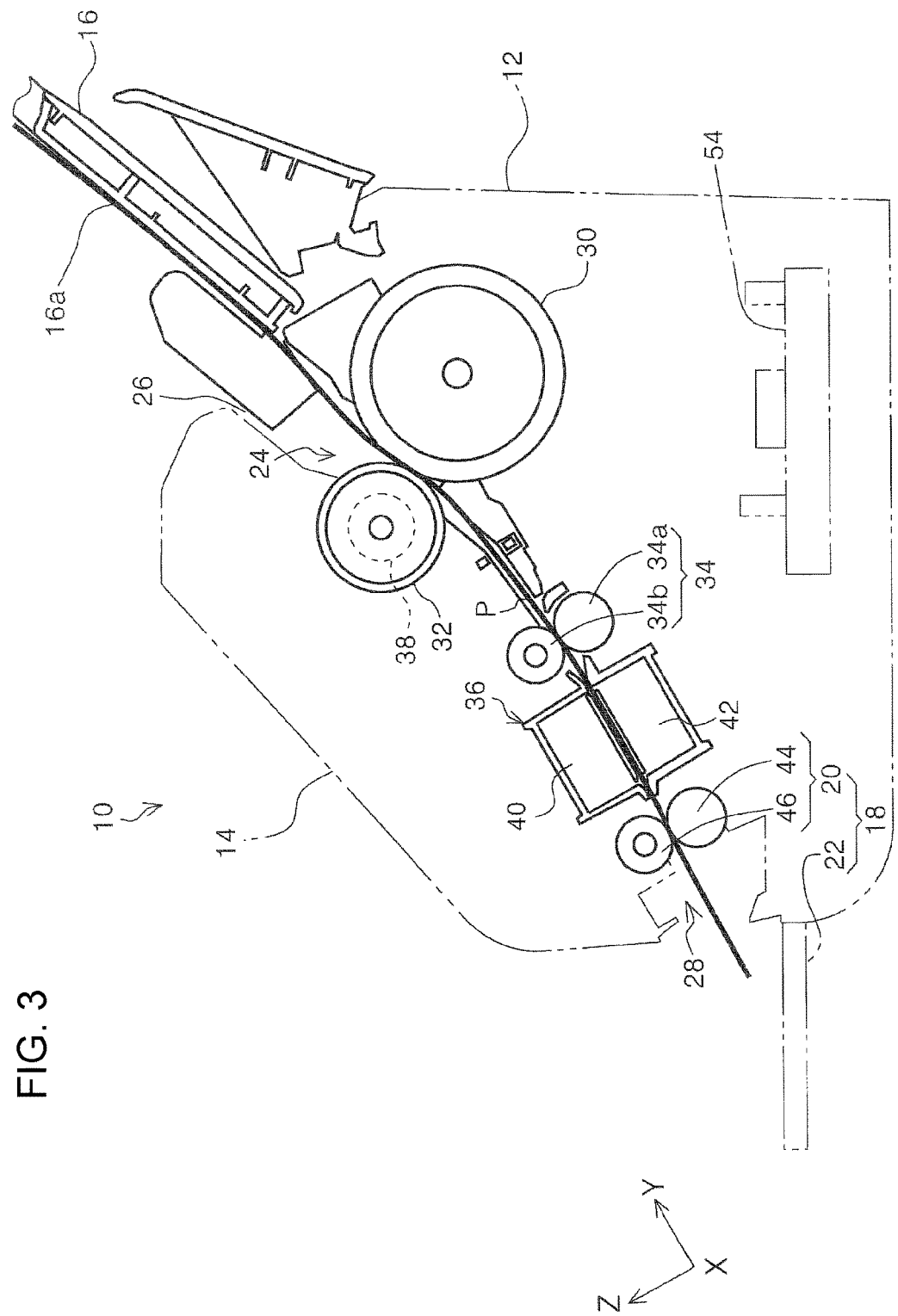
FIG. 3 is a side view which illustrates a medium feeding path in the image reading apparatus according to the invention.
Figure 4:
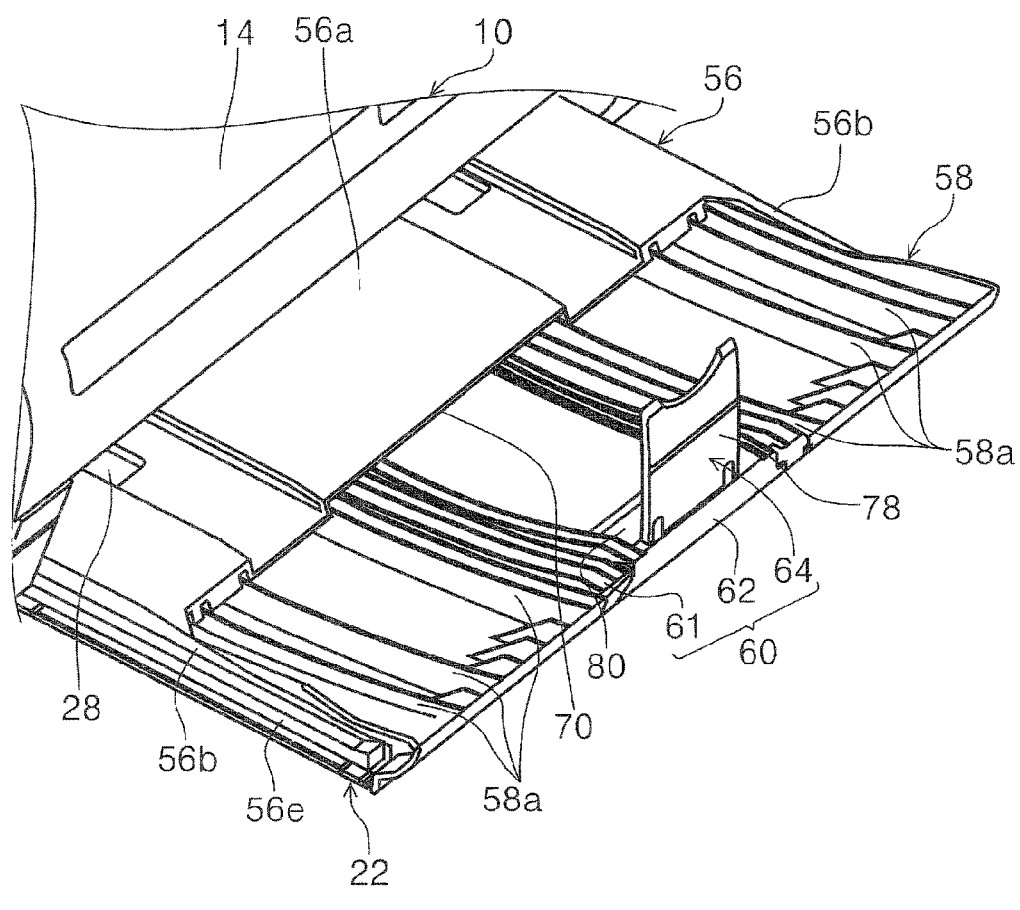
FIG. 4 is a perspective view which illustrates an extended state of a base tray of the medium receiving tray.
Figure 5:
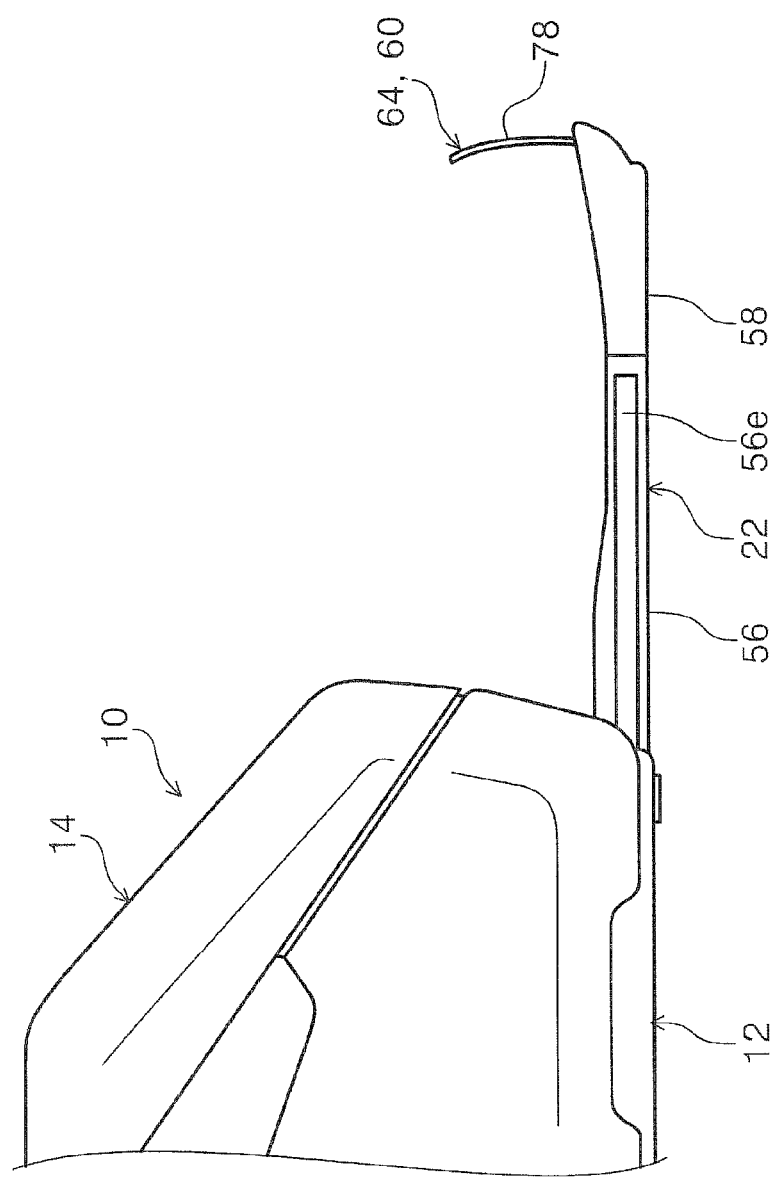
FIG. 5 is a side view which illustrates a state in which a main extendeding unit is extended from the base tray in the medium receiving tray.
Figure 6:
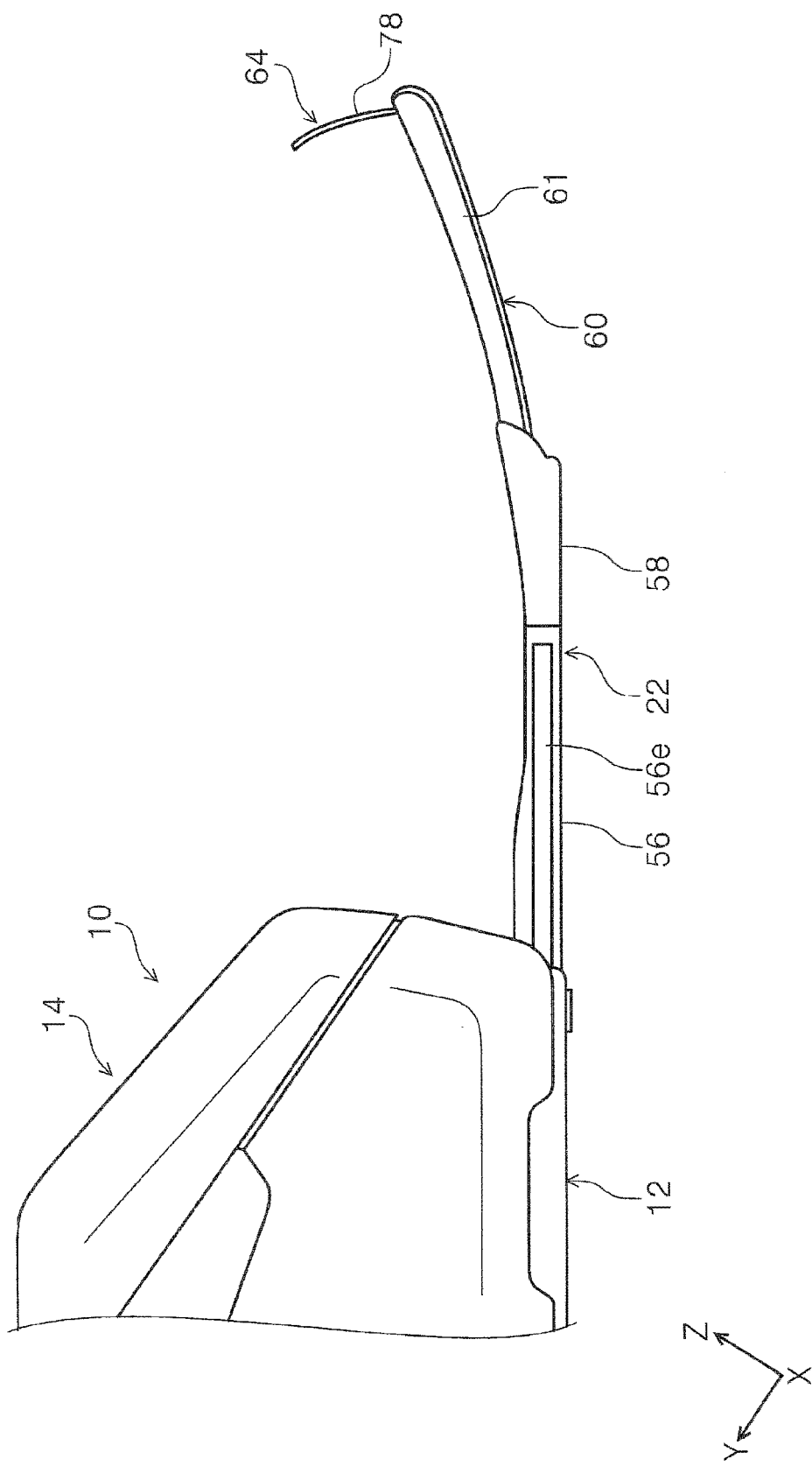
FIG. 6 is a side view which illustrates a state in which a first sub-extendeding unit is extended from the main extendeding unit in the medium receiving tray.

FIG. 1 is a perspective view which illustrates a non-feeding state of a medium in an image reading apparatus according to the invention, FIG. 2 is a perspective view which illustrates a state in which a cover is opened, and a medium receiving tray is extended, in the image reading apparatus according to the invention, FIG. 3 is a side view which illustrates a medium feeding path in the image reading apparatus according to the invention, FIG. 4 is a perspective view which illustrates an extended state of a base tray of the medium receiving tray, FIG. 5 is a side view which illustrates a state in which a main extendeding unit is extended from the base tray in the medium receiving tray, and FIG. 6 is a side view which illustrates a state in which a first sub-extendeding unit is extended from the main extendeding unit in the medium receiving tray.

Figure 7:
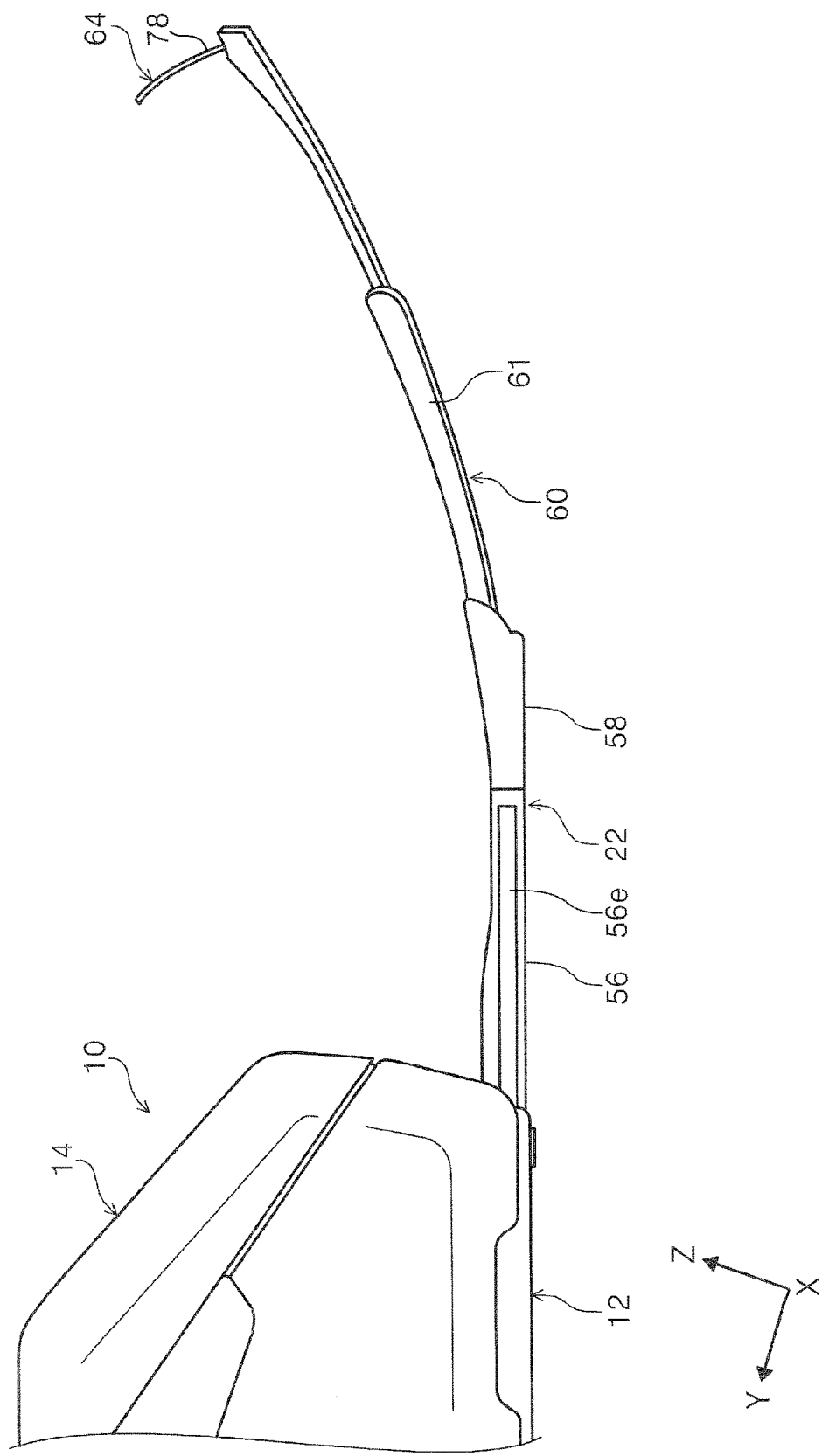
FIG. 7 is a side view which illustrates a state in which a tip end extendeding portion is extended from the first sub-extendeding unit in the medium receiving tray.
Figure 8:
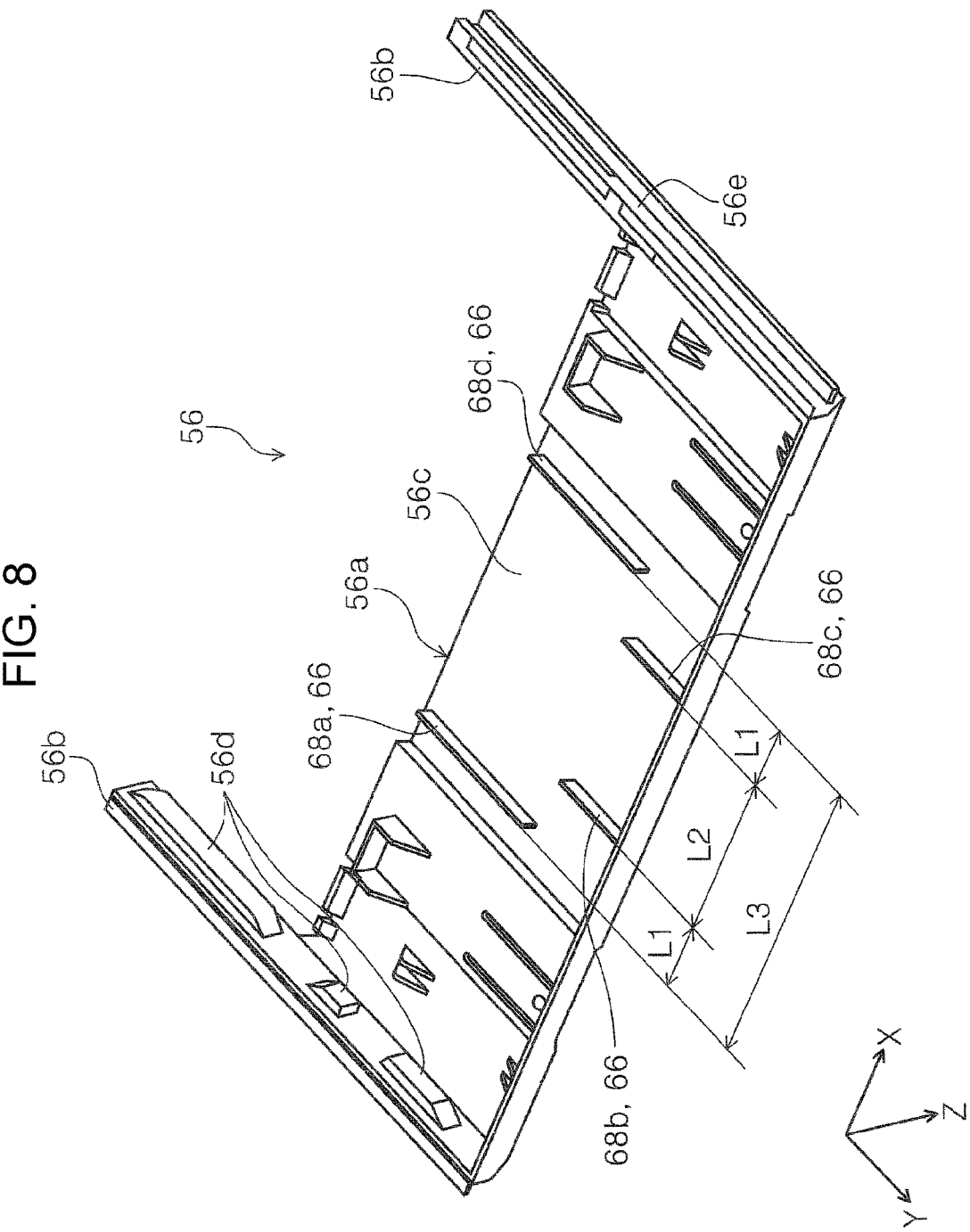
FIG. 8 is a perspective view in which the base tray is viewed from below.
Figure 9:
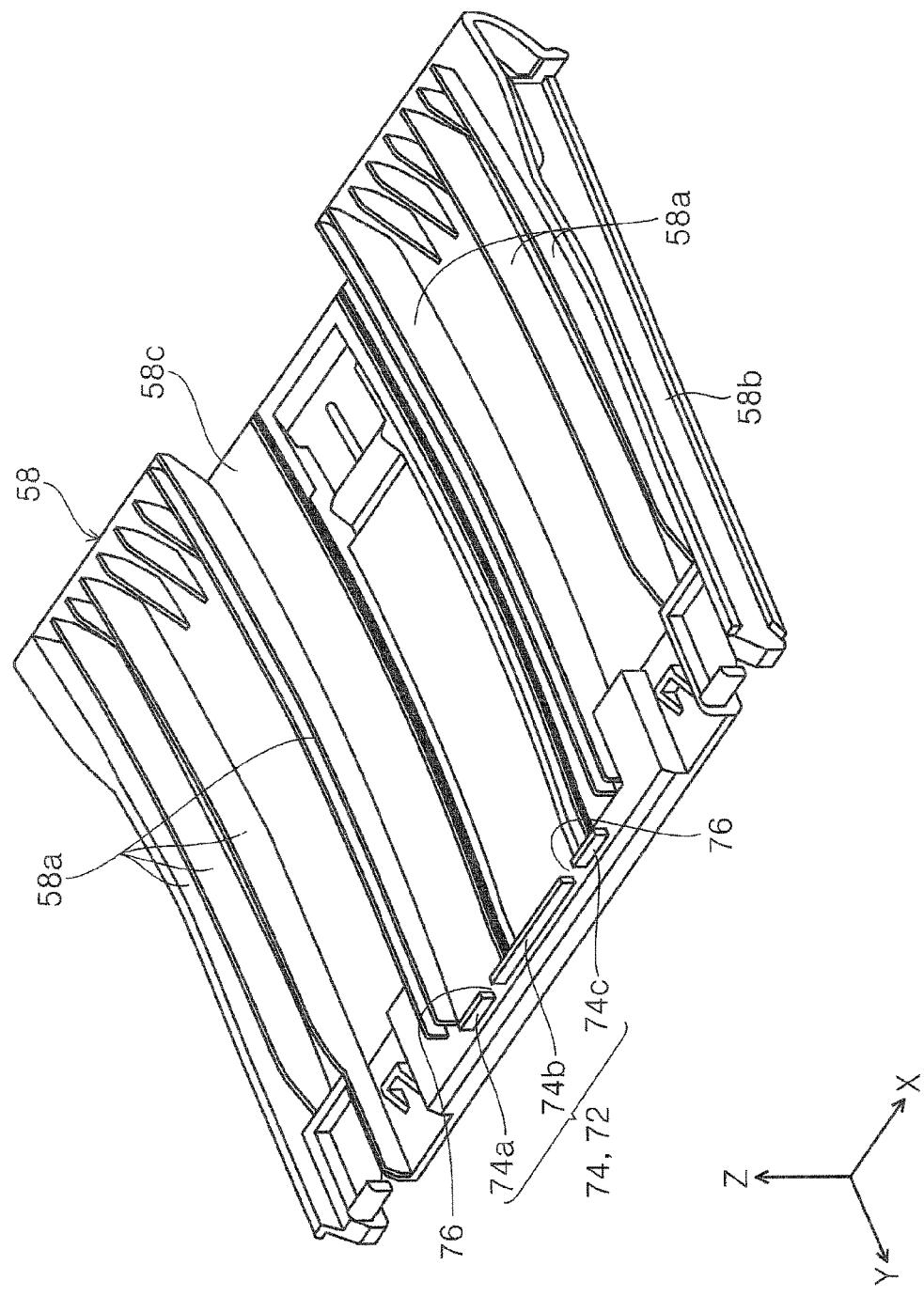
FIG. 9 is a perspective view in which the main extendeding unit is viewed from above.
Figure 10:
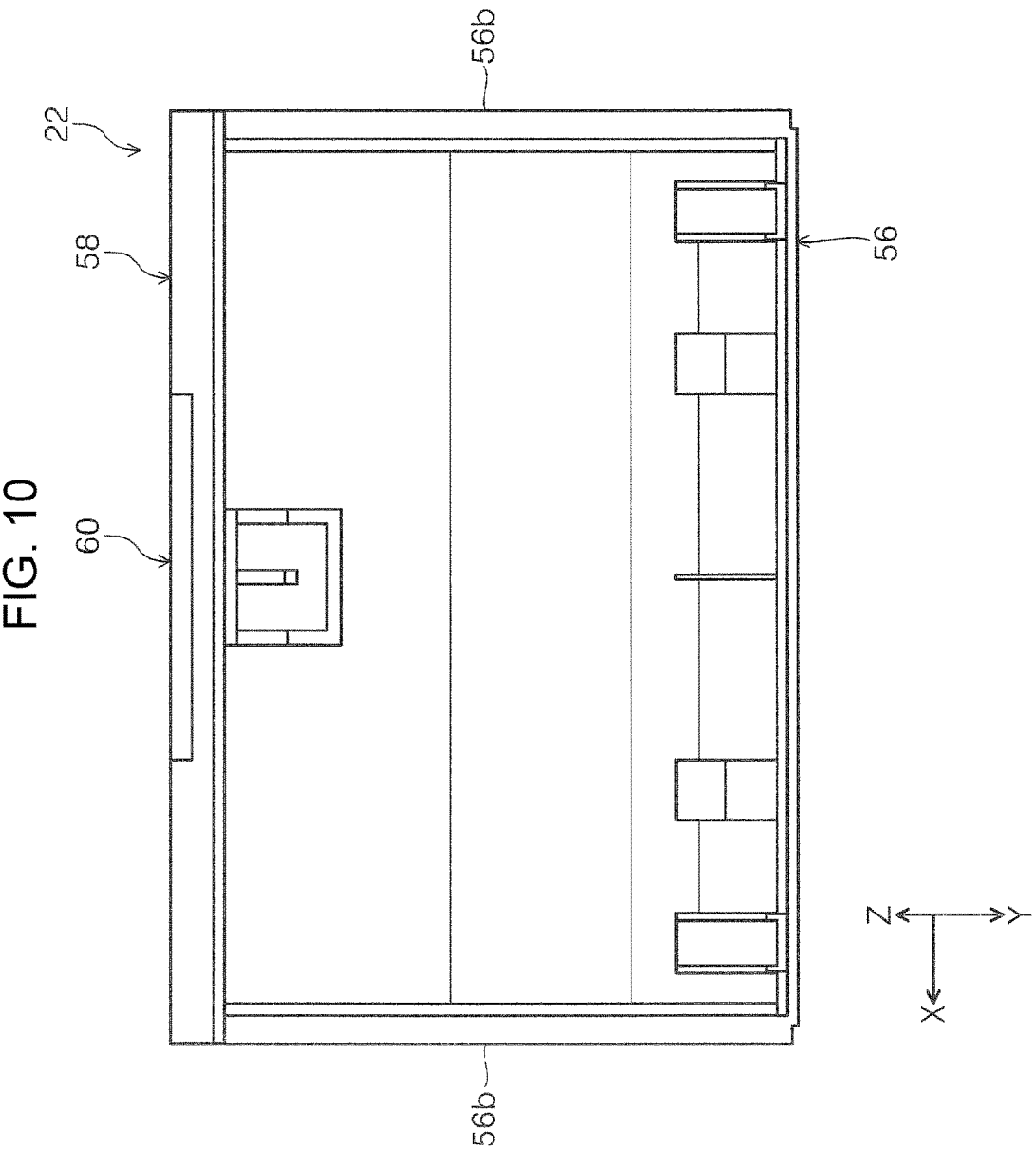
FIG. 10 is a bottom view of the base tray and the main extendeding unit in a state in which the main extendeding unit is accommodated in the base tray.
Figure 11:
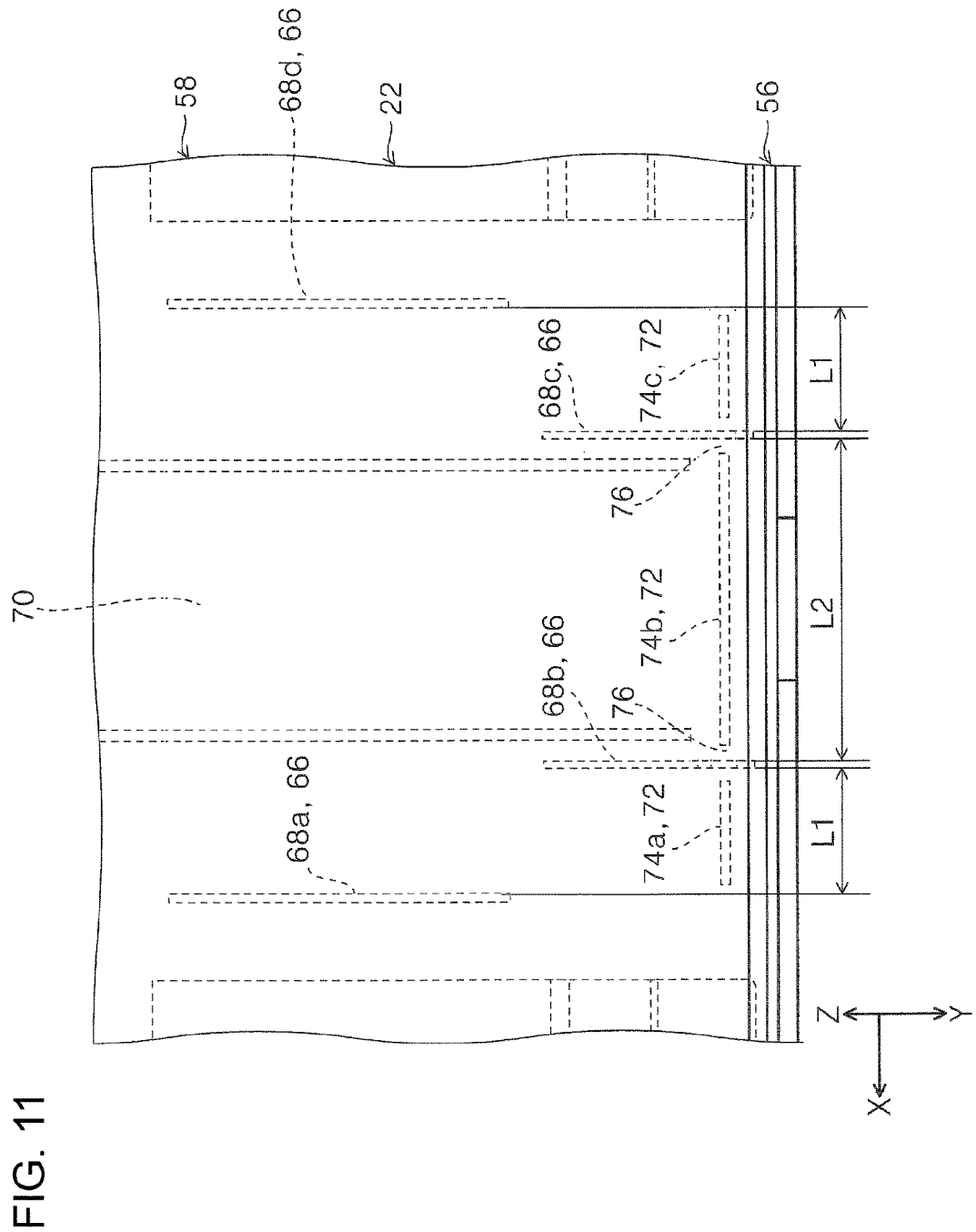
FIG. 11 is a bottom view which illustrates a relationship between a first rib and a second rib in a state in which the main extendeding unit is accommodated in the base tray.
Figure 12:
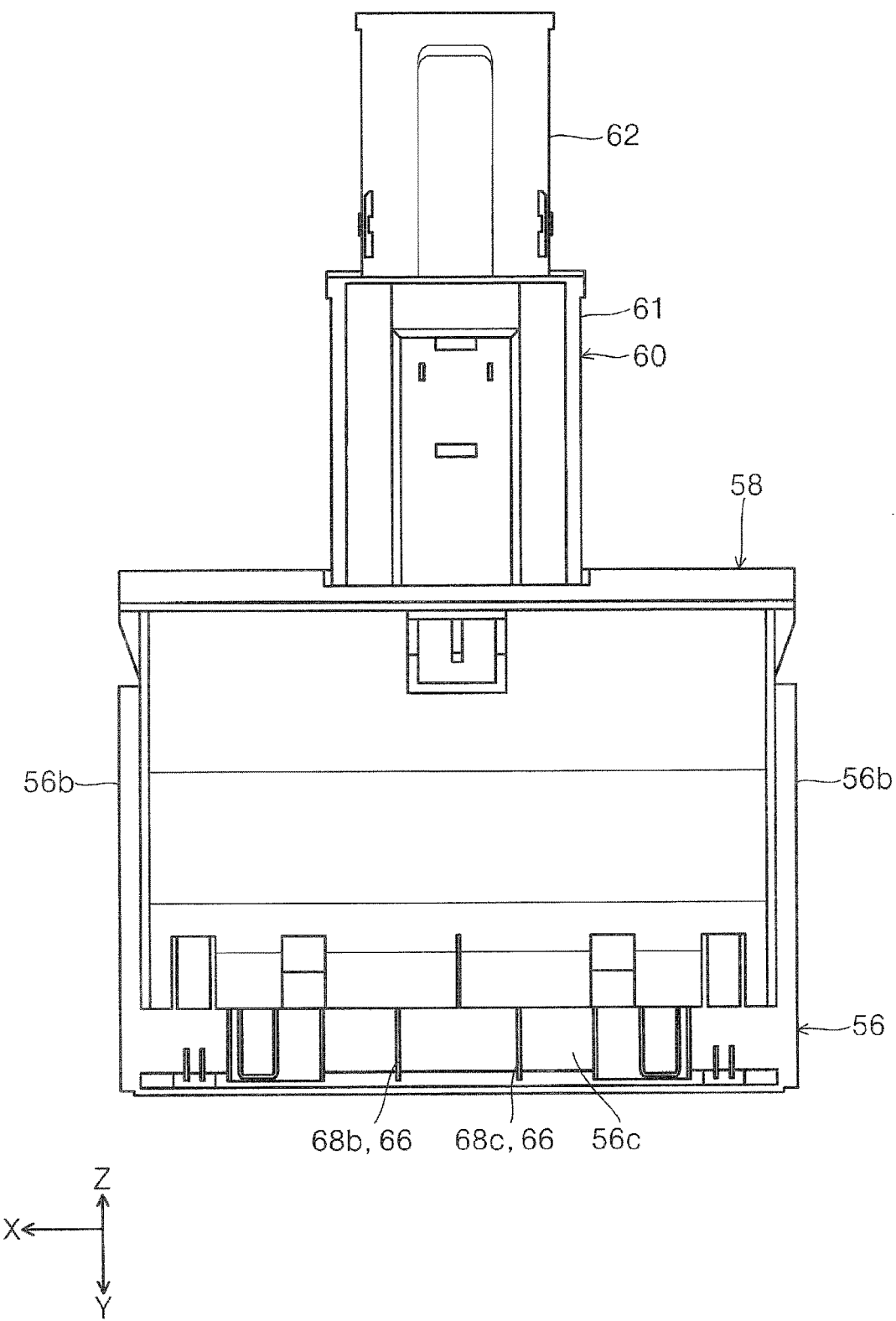
FIG. 12 is a bottom view of the base tray and the main extendeding unit in a state in which the main extendeding unit is being switched from an accommodated state to an extended state with respect to the base tray.

FIG. 7 is a side view which illustrates a state in which a tip end extendeding portion is extended from the first sub-extendeding unit in the medium receiving tray, FIG. 8 is a perspective view in which the base tray is viewed from below, FIG. 9 is a perspective view in which the main extendeding unit is viewed from above, FIG. 10 is a bottom view of the base tray and the main extendeding unit in a state in which the main extendeding unit is accommodated in the base tray, FIG. 11 is a bottom view which illustrates a relationship between a first rib and a second rib in a state in which the main extendeding unit is accommodated in the base tray, and FIG. 12 is a bottom view of the base tray and the main extendeding unit in a state in which the main extendeding unit is being switched from an accommodated state to an extended state with respect to the base tray.

Figure 13:
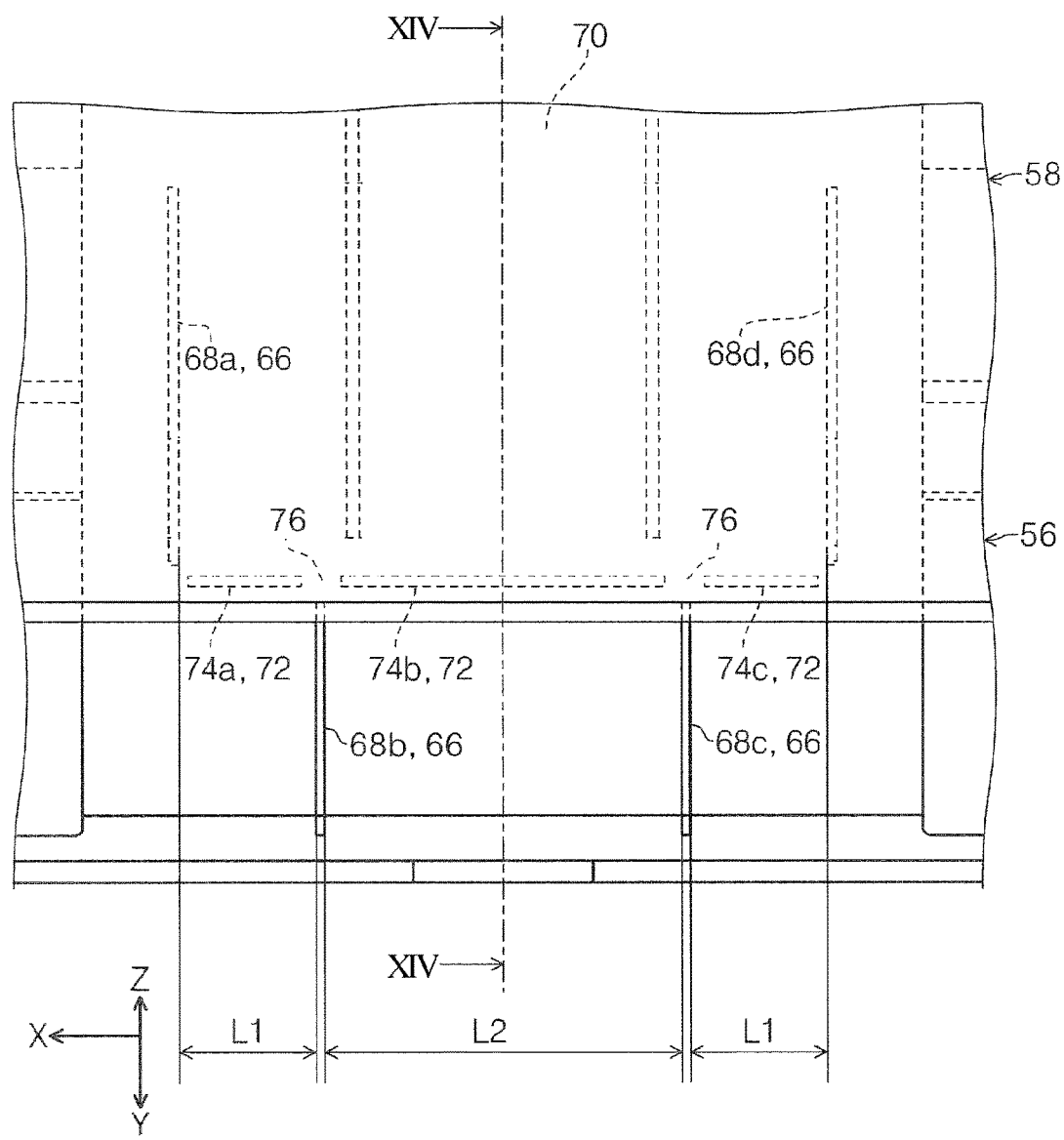
FIG. 13 is a bottom view which illustrates a relationship between the first rib and the second rib in a state in which the main extendeding unit is being switched from an accommodated state to an extended state with respect to the base tray.
Figure 14:
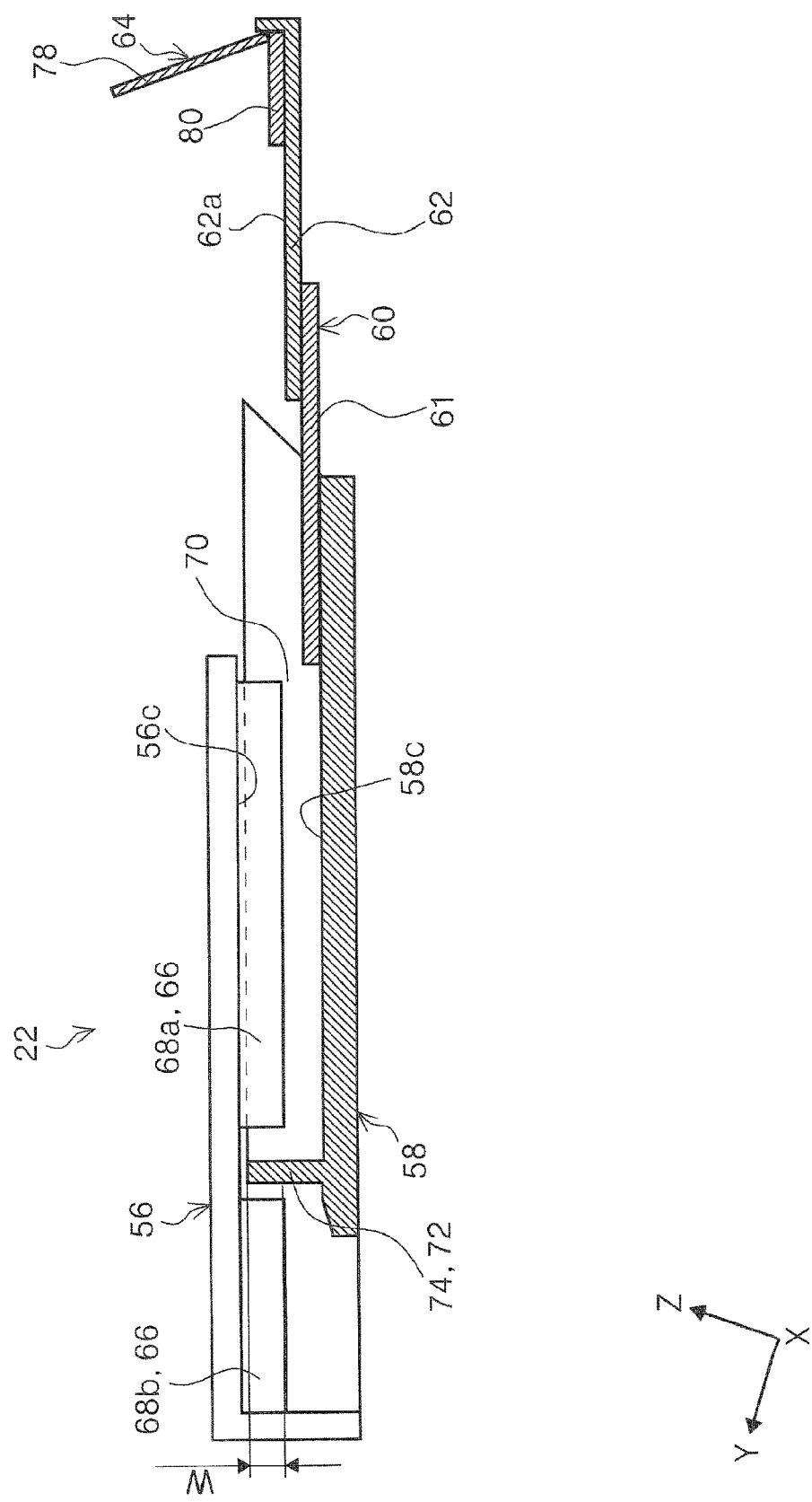
FIG. 14 is a side sectional view in a section XIV-XIV in FIG. 13.
Figure 15:
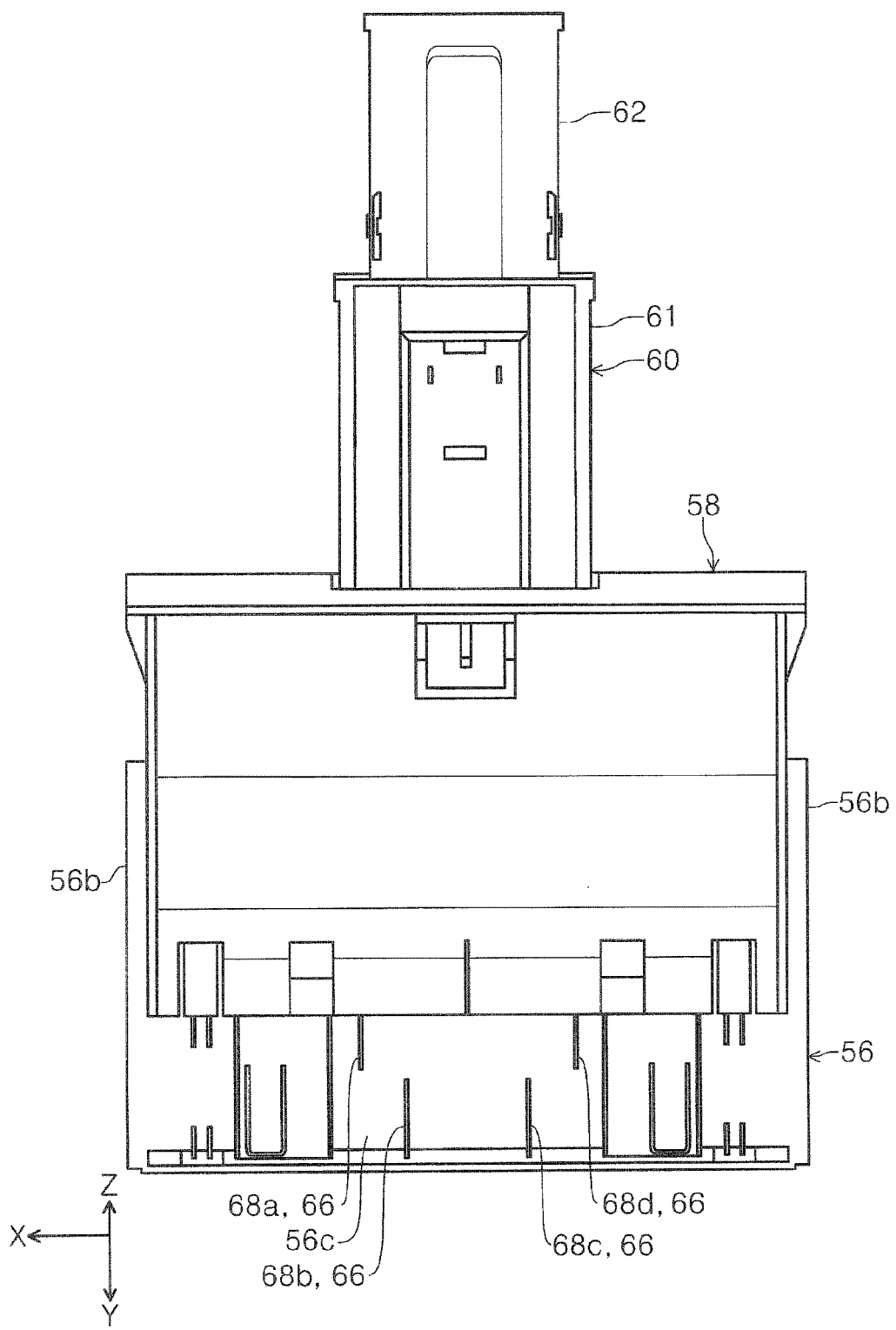
FIG. 15 is a bottom view of the base tray, the main extendeding unit, and the sub-extendeding unit in a state in which the main extendeding unit and the sub-extendeding unit are extended with respect to the base tray.
Figure 16:
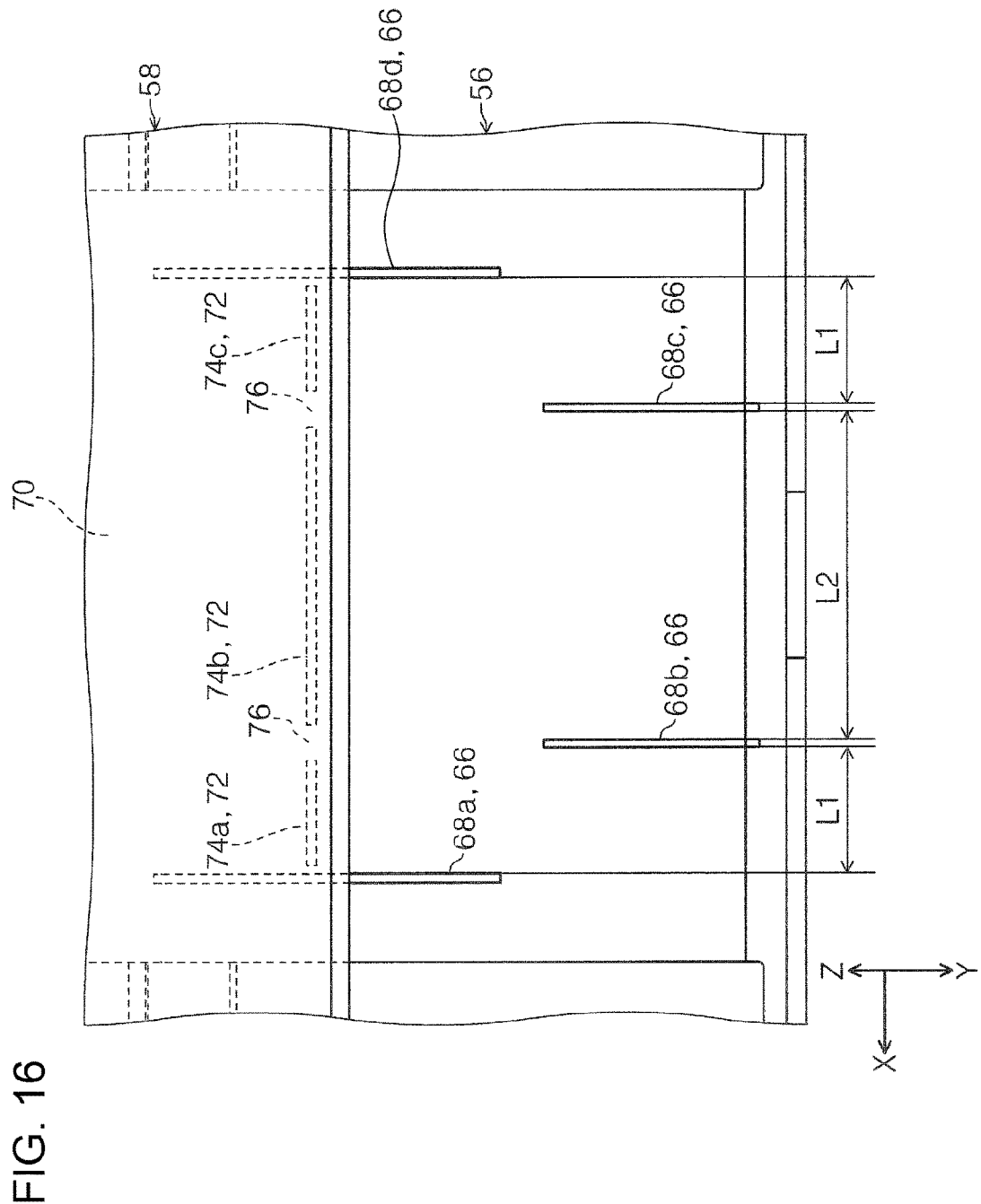
FIG. 16 is a bottom view which illustrates a relationship between the first rib and the second rib in a state in which the main extendeding unit is extended with respect to the base tray.
Figure 17:
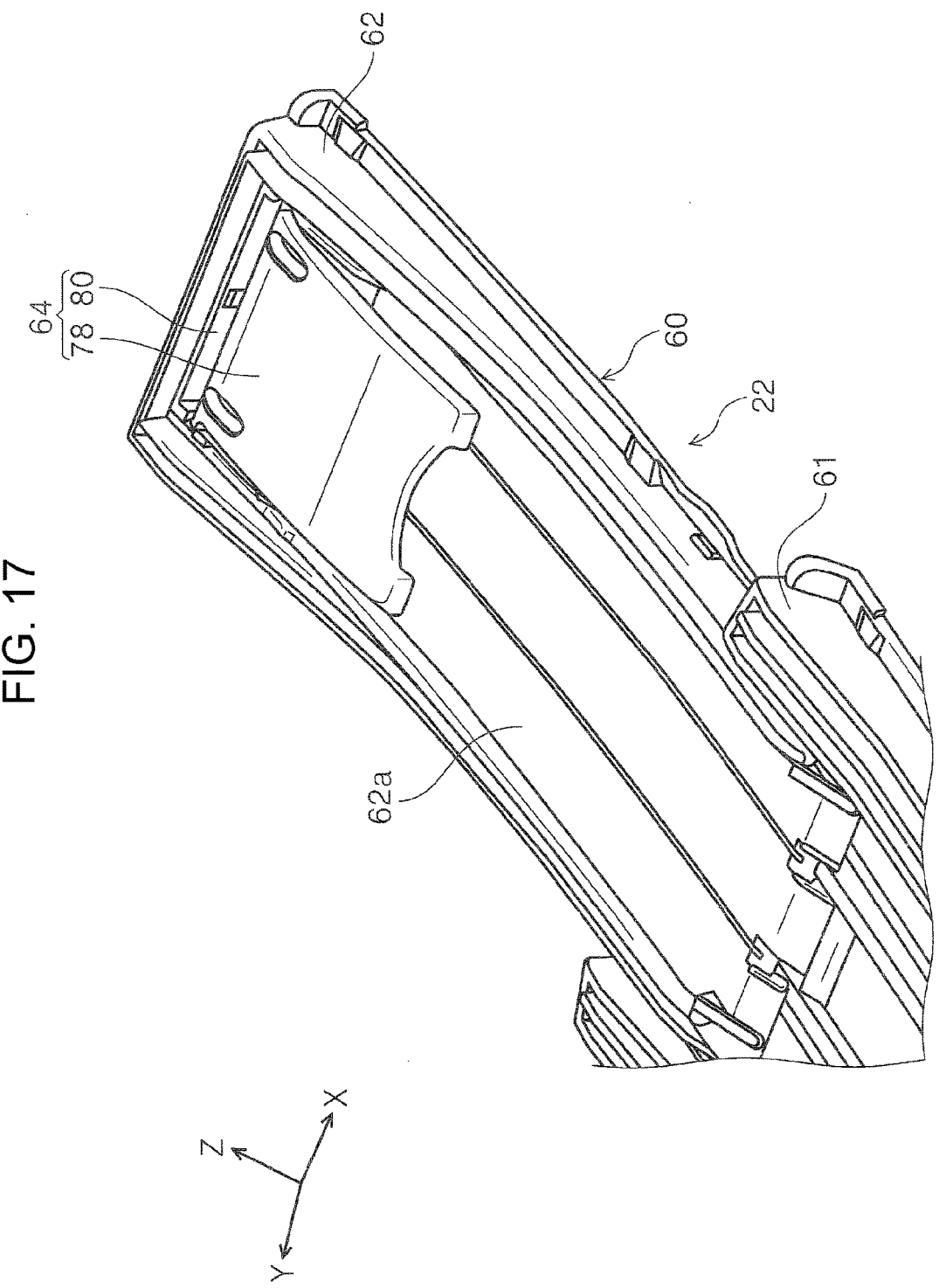
FIG. 17 is a perspective view which illustrates an accommodated posture of a stopper portion in a tip end extendeding portion.
Figure 18:
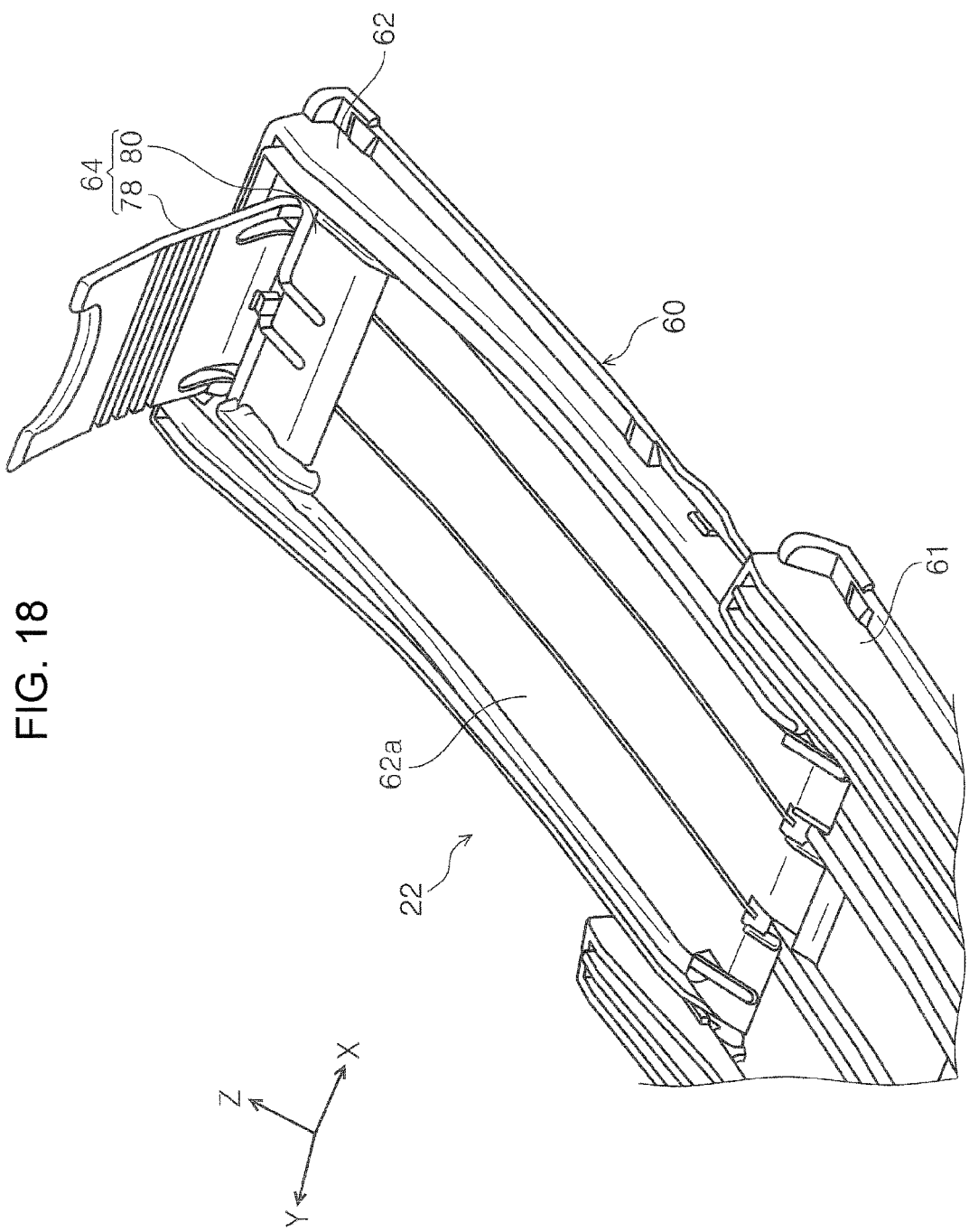
FIG. 18 is a perspective view which illustrates a regulating posture of the stopper portion in the tip end extendeding portion.
Figure 19:
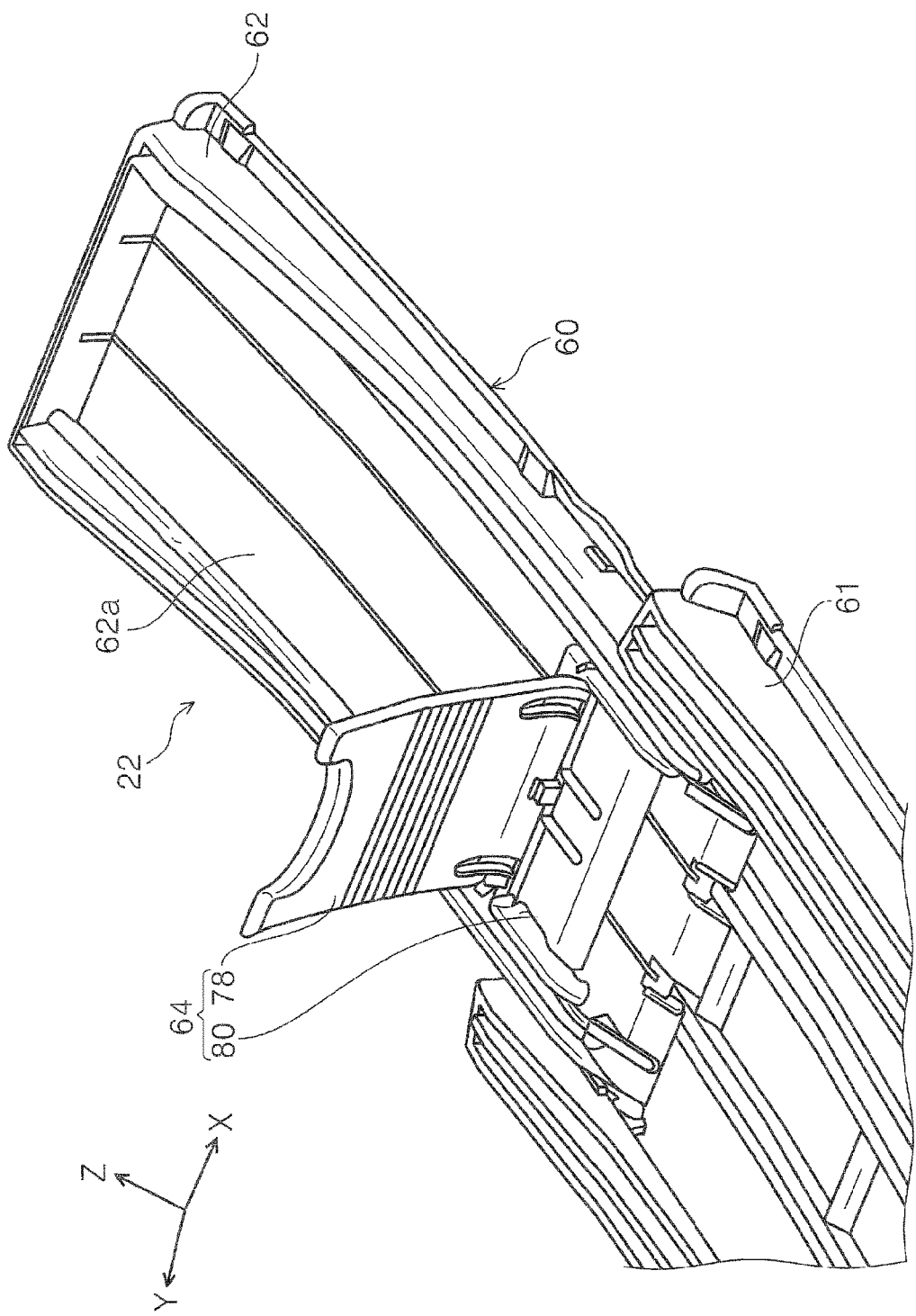
FIG. 19 is a perspective view which illustrates a state in which the stopper portion is slid in the tip end extendeding portion.

FIG. 13 is a bottom view which illustrates a relationship between the first rib and the second rib in a state in which the main extendeding unit is being switched from an accommodated state to an extended state with respect to the base tray, FIG. 14 is a side sectional view in a section XIV-XIV in FIG. 13, FIG. 15 is a bottom view of the base tray, the main extendeding unit, and the sub-extendeding unit in a state in which the main extendeding unit and the sub-extendeding unit are extended with respect to the base tray, FIG. 16 is a bottom view which illustrates a relationship between the first rib and the second rib in a state in which the main extendeding unit is extended with respect to the base tray, FIG. 17 is a perspective view which illustrates an accommodated posture of a stopper portion in a tip end extendeding portion, FIG. 18 is a perspective view which illustrates a regulating posture of the stopper portion in the tip end extendeding portion, and FIG. 19 is a perspective view which illustrates a state in which the stopper portion is slid in the tip end extendeding portion.

Figure 20:
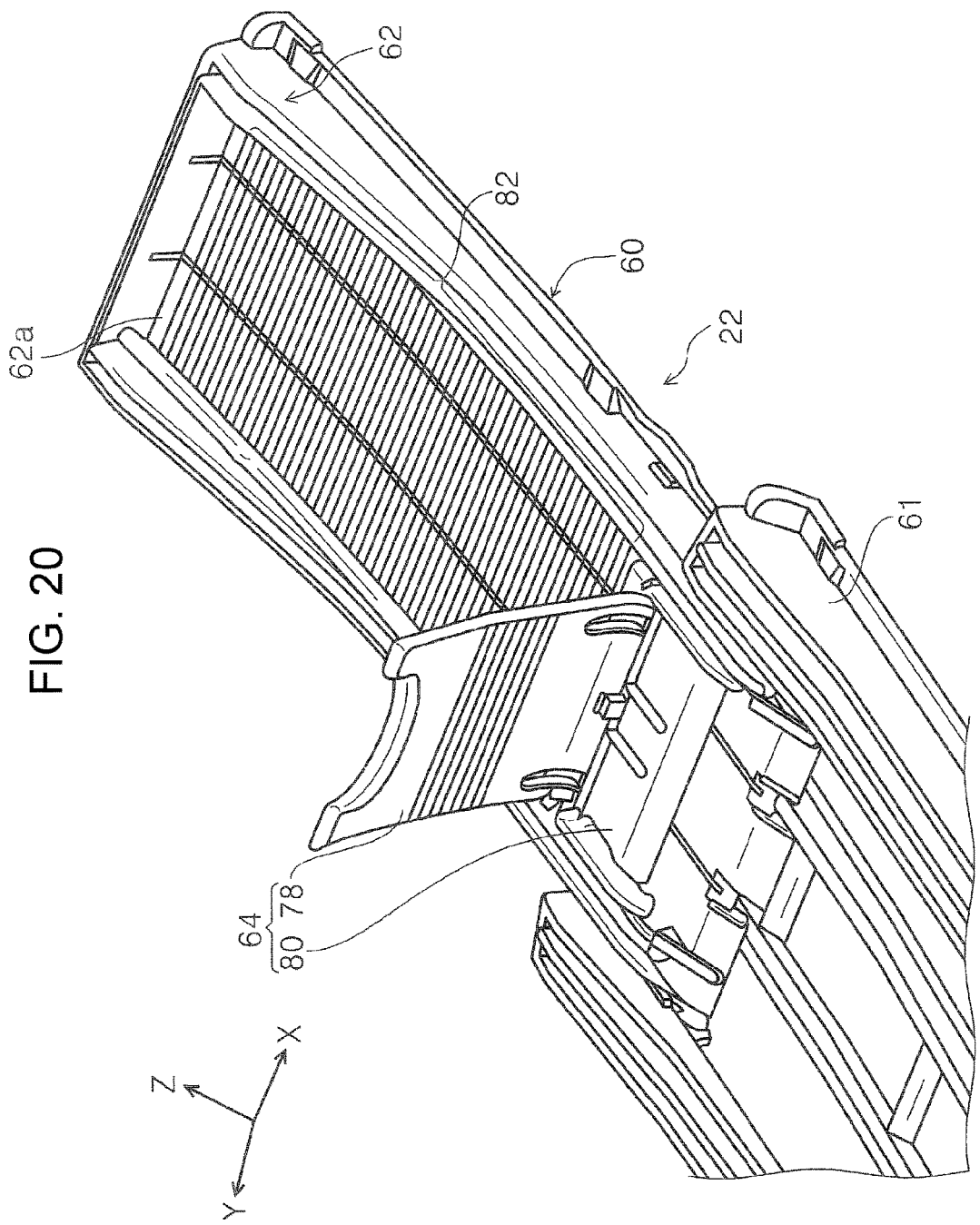
FIG. 20 is a perspective view which illustrates one modification example of the embodiment of the tip end extendeding portion and the stopper portion.
Figure 22:
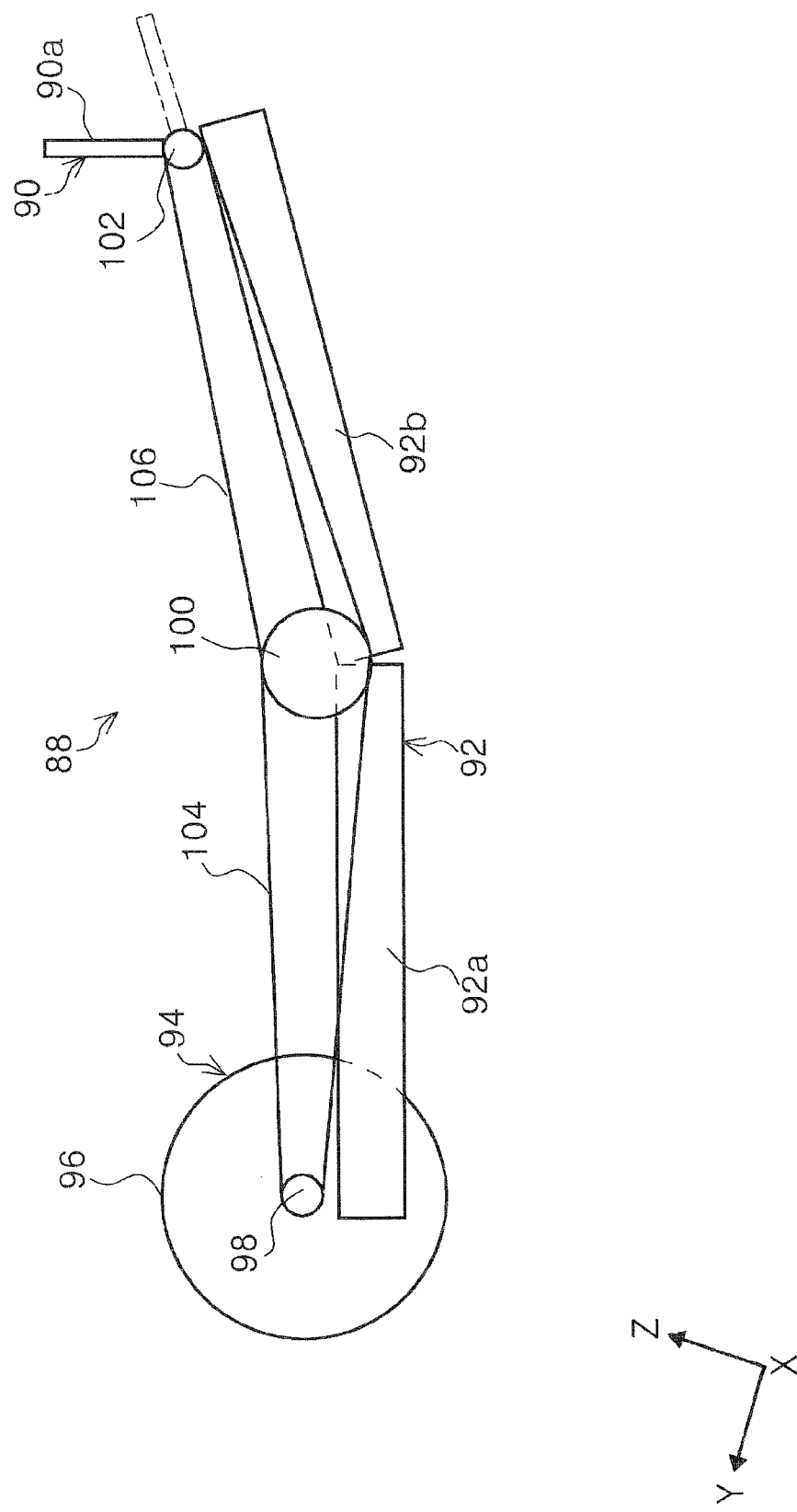
FIG. 22 is a schematic diagram of a medium receiving tray in a second embodiment.
Figure 24:
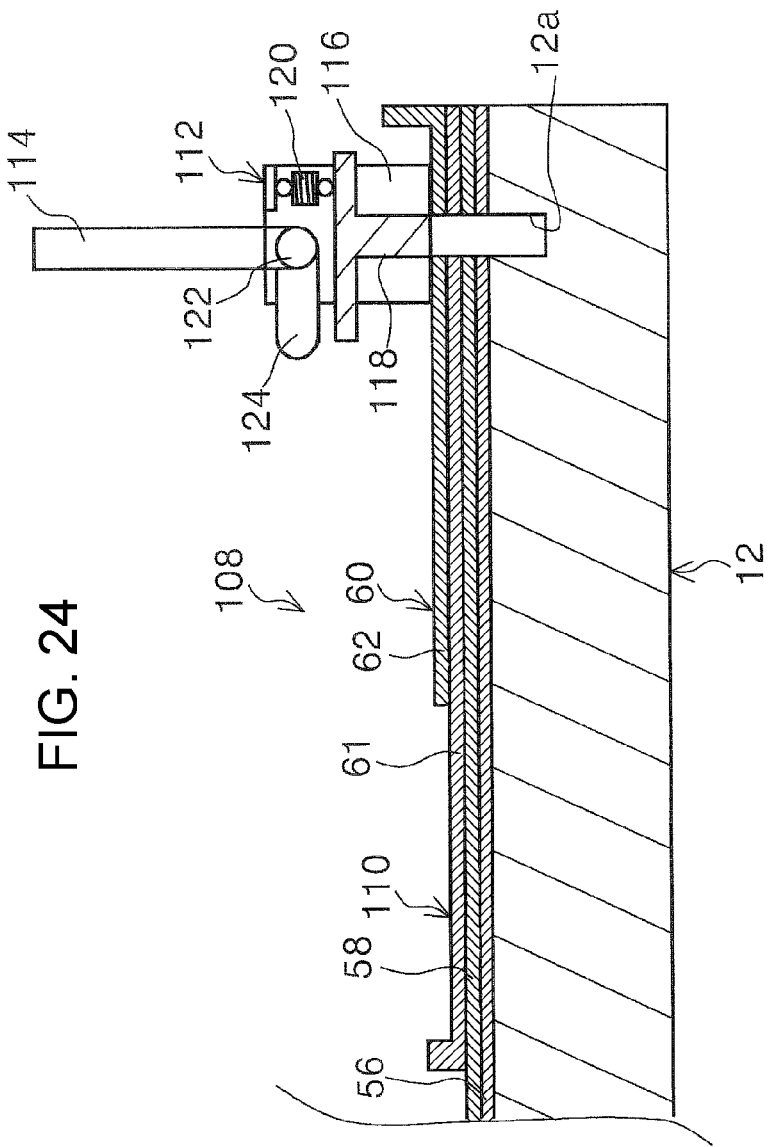
FIG. 24 is a side sectional view which illustrates a state in which locking of the main extendeding unit and the sub-extendeding unit is released in the medium receiving tray in the third embodiment.

FIG. 20 is a perspective view which illustrates one modification example of the embodiment of the tip end extendeding portion and the stopper portion, FIG. 21 is a side sectional view which illustrates a slider locking structure in the modification example of the stopper portion, FIG. 22 is a schematic diagram of a medium receiving tray in a second embodiment, FIG. 23 is a side sectional view which illustrates a locked state of a main extendeding unit and a sub-extendeding unit in a medium receiving tray in a third embodiment, FIG. 24 is a side sectional view which illustrates a state in which locking of the main extendeding unit and the sub-extendeding unit is released in the medium receiving tray in the third embodiment, FIG. 25 is a perspective view which illustrates an image reading unit in an image reading apparatus, and FIG. 26 is a sectional view of a discharging driving roller.

In X-Y-Z coordinates illustrated in each diagram, an X direction is an apparatus width direction and a sheet width direction, a Y direction is a medium transport direction in the image reading apparatus, and a Z direction is a direction orthogonal to the Y direction, and a direction which is approximately orthogonal to a face of a medium which is transported. In addition, a −Y direction side is set to a front face side of the apparatus, and a +Y direction side is set to a rear face side of the apparatus, in each diagram.

First Embodiment

Regarding Image Reading Apparatus

When referring to FIGS. 1 and 2, a scanner 10 as the "image reading apparatus" is provided with a lower unit 12, a higher unit 14, a cover unit 16, and a medium discharging device 18. The medium discharging device 18 is provided with a pair of discharging rollers 20 (refer to FIG. 3) and a medium receiving tray 22 (refer to FIG. 2) which will be described later. Exteriors of the lower unit 12 and the higher unit 14 configure a housing of the scanner 10.

The cover unit 16 is attached to a higher part on a rear face side of the lower unit 12 so as to rotate with respect to the lower unit 12. As illustrated in FIG. 1, the cover unit 16 obtains a non-feeding state in which a higher part of the higher unit 14 and a feeding port 26 (refer to FIG. 2) are covered, and a feeding state in which the cover unit rotates to a rear face side of the apparatus from the non-feeding state in FIG. 1, as illustrated in FIG. 2, and opens the feeding port 26. When the cover unit 16 enters the feeding state as illustrated in FIG. 2, a rear face of the cover unit 16 functions as a medium mounting face 16a on which a plurality of mediums P are mounted.

A discharging port 28 which discharges a medium P is provided on an apparatus front face side of the lower unit 12. The lower unit 12 is provided with the medium receiving tray 22 which can be pulled out toward the apparatus front side from the discharging port 28. The medium receiving tray 22 can be switched between an accommodated state of being accommodated in a base portion of the lower unit 12 (refer to FIG. 1) and an extended state of being pulled out to the apparatus front side (refer to FIG. 2). The medium receiving tray 22, though it will be described later, is configured by connecting a plurality of tray members, and is configured so as to adjust a pulling-out length from the discharging port 28, according to a length of the medium P which is discharged.

Regarding Sheet Feeding Path in Scanner

Subsequently, a medium feeding path 24 in the scanner 10 will be described with reference to FIG. 3, mainly. In FIG. 3, only outlines of the lower unit 12, the higher unit 14, and the medium receiving tray 22 are denoted by virtual lines, and a thick solid line to which a mark P is attached denotes a guide path of a sheet which is fed along the medium feeding path 24 in the scanner 10.

In the medium feeding path 24, the medium mounting face 16a, a feeding roller 30, a separating roller 32, a pair of transport rollers 34, an image reading unit 36 as a "reading unit", a pair of discharging rollers 20 as a "discharging unit", and the medium receiving tray 22 are provided in order from an upstream side toward a downstream side in a feeding direction. A medium P is fed to the image reading unit 36 along the medium feeding path 24, and is discharged to the medium receiving tray 22 after at least one face thereof is read in the image reading unit 36.

The feeding roller 30 is configured so as to be driven in a rotating manner using a driving source which is not illustrated. An outer peripheral face of the feeding roller 30 is formed of a high friction material (for example, elastomer, or the like, such as rubber). The separating roller 32 is provided at a position which faces the feeding roller 30. The separating roller 32 is provided in a state of being urged against the feeding roller 30 by the urging unit (not illustrated). An outer peripheral face of the separating roller 32 is formed of a high friction material (for example, elastomer, or the like, such as rubber), similarly to the feeding roller 30.

A torque limiter 38 is provided in the separating roller 32. The separating roller 32 is configured so as to accommodate a driving torque in a direction opposite (counterclockwise direction in FIG. 3) to a rotating direction (clockwise direction in FIG. 3) in which a document from a driving source such as a torque imparting unit (not illustrated), a motor, or the like, is transported to the downstream side through the torque limiter 38. In addition, the separating roller 32 rotates by being driven in accordance with the feeding roller 30 (clockwise direction in FIG. 3), since rotation torque which is accommodated from the feeding roller 30 exceeds limit torque of the torque limiter 38, in a state in which the separating roller 32 is in direct contact with the feeding roller 30.

The pair of transport rollers 34 is provided with a transport driving roller 34a, and a transport driven roller 34b which is rotatably driven by the transport driving roller 34a. In the embodiment, the transport driving roller 34a is configured so as to be driven in a rotating manner using a driving source (not illustrated).

The image reading unit 36 is provided on the downstream side of the pair of transport rollers 34. Here, the image reading unit 36 is provided with a higher reading unit 40 which is provided in the higher unit 14 so as to face a top face of a medium P transported along the medium feeding path 24, and a lower reading unit 42 which is provided in the lower unit 12 so as to face a lower face of the medium P transported along the medium feeding path 24. The higher reading unit 40 and the lower reading unit 42 are configured as a reading unit, and are configured as a contact-type image sensor module (CISM) as an example.

The pair of discharging rollers 20 is provided with a discharging driving roller 44, and a discharging driven roller 46 which is rotatably driven by the discharging driving roller 44. The discharging driving roller 44 is driven in a rotating manner using a driving source (not illustrated).

Here, when referring to FIGS. 25 and 26, two discharging driving rollers 44 are provided with an interval in a width direction of the apparatus. The two discharging driving rollers 44 are attached to a driving shaft 48 so as to rotate along with the driving shaft 48. Respective auxiliary rollers 50 are lightly press-fitted to the driving shaft 48 on the outside of the discharging driving roller 44 in the width direction of the apparatus. In addition, the discharging driving roller 44 and the auxiliary rollers 50 are attached to the driving shaft 48 with an interval 52 in the width direction of the apparatus.

When the pair of discharging roller 20 discharges a thin medium in the scanner 10, there is a case in which a rear end of the medium P remains in the discharging driving roller 44. In addition, when discharging a thin medium, the auxiliary roller 50 can reliably separate the rear end of the medium P from the discharging driving roller 44 by pushing out the rear end of the medium P in a discharging direction. Since the interval 52 is provided between the auxiliary roller 50 and the discharging driving roller 44, it is possible to prevent a situation in which the auxiliary roller 50 comes into contact with the discharging driving roller 44, and is worn away when the auxiliary roller 50 idly rotates with respect to the driving shaft 48.

As an example, a control unit 54 as a "controller" is provided in the lower unit 12. The control unit 54 is configured as an electric circuit which is provided with a plurality of electronic components. The control unit 54 controls the higher reading unit 40 and the lower reading unit 42. In addition, the control unit 54 controls a driving source (not illustrated) such as a driving motor which drives the feeding roller 30, the transport driving roller 34a, and the discharging driving roller 44 in a rotating manner.

The control unit 54 is configured so as to control a transport of a medium P, and an image reading operation in the scanner 10. The control unit 54 may control an operation which is necessary to execute a document reading operation in the scanner 10, based on an instruction from the outside (PC, or the like).

Regarding Configuration of Medium Receiving Tray

A configuration of the medium receiving tray 22 will be described with reference to FIGS. 4 to 20. As illustrated in FIGS. 2 and 4 to 7, the medium receiving tray 22 is provided with a base tray 56, a main extendeding unit 58, and a sub-extendeding unit 60. The sub-extendeding unit 60 is provided with a first sub-extendeding unit 61, a tip end extendeding portion 62, and a stopper portion 64. In the following descriptions, a discharging direction of a medium P is set to a front side in an apparatus depth direction, a sliding direction between each member is set to the apparatus depth direction, and a width direction of the medium P is set to a width direction of the apparatus.

The base tray 56 is configured so as to slide with respect to the lower unit 12, and the base tray can be switched between state of being accommodated in the lower unit 12 (refer to FIG. 1) and an extended state of being extended in the discharging direction of the medium P from the inside of the lower unit 12, that is, a state of being extended to the front face side in the apparatus depth direction (refer to FIG. 4). The main extendeding unit 58 is attached to the base tray 56 so as to slide. In addition, the main extendeding unit 58 is configured so as to switch between an accommodated state of being accommodated in the base tray 56 (refer to FIG. 4) and an extended state of being slid to the front face side in the apparatus depth direction of the medium P from the base tray 56 (refer to FIG. 5).

The first sub-extendeding unit 61 is attached to the main extendeding unit 58 so as to slide. In addition, the first sub-extendeding unit 61 is configured so as to switch between an accommodated state of being accommodated in the main extendeding unit 58 (refer to FIG. 4) and an extended state of being slid on the front face side in the apparatus depth direction of the medium P from the main extendeding unit 58 (refer to FIG. 6). The tip end extendeding portion 62 is attached to the first sub-extendeding unit 61 so as to be slid. In addition, the tip end extendeding portion 62 is configured so as to switch between an accommodated state of being accommodated in the first sub-extendeding unit 61 (refer to FIG. 4) and an extended state of being slid on the front face side in the apparatus depth direction of the medium P from the first sub-extendeding unit 61 (refer to FIG. 7).

Accordingly, the medium receiving tray 22 can set the base tray 56, the main extendeding unit 58, the first sub-extendeding unit 61, and the tip end extendeding portion 62 which are accommodated in the lower unit 12, as illustrated in FIG. 1, to a state in which the base tray 56, the main extendeding unit 58, the first sub-extendeding unit 61, and the tip end extendeding portion 62 are sequentially pulled out in the discharging direction of the medium P, and are extended on the front face side in the apparatus depth direction of the lower unit 12, (refer to FIG. 2) as illustrated in FIGS. 4 to 7.

Regarding Base Tray

Subsequently, the base tray 56 will be described with reference to FIGS. 4 and 8. The base tray 56 is provided with a planar plate-shaped main body portion 56a, and a pair of side wall portions 56b which extends in the apparatus depth direction at both end portions in the apparatus width direction of the main body portion 56a. A top face of the main body portion 56a is configured as a tray face which accommodates a medium P discharged from the discharging port 28. A center portion in the apparatus width direction on the lower face side of the main body portion 56a is configured of a recessed portion 56c which is recessed toward the top face side. In addition, a first protrusion portion 66 which protrudes toward the main extendeding unit 58 side in a state in which the main extendeding unit 58 is attached to the lower side in the apparatus height direction is provided in the recessed portion 56c.

The first protrusion portion 66 is provided with a plurality of first rib 68 which extend in the apparatus width direction, for example. The plurality of first ribs 68 are formed in the recessed portion 56c with an appropriate interval in the apparatus depth direction. In FIG. 8, the first rib 68 is provided with four ribs 68a, 68b, 68c, and 68d. The first rib 68a and the first rib 68b are provided in the apparatus width direction with an interval L1, the first rib 68b and the first rib 68c are provided with an interval L2, and the first rib 68c and the first rib 68d are provided with an interval L1. Here, the interval L2 is set to be larger than the interval L1. In addition, the first rib 68a and the first rib 68d are set so as to have an interval L3.

A disposing interval L2 (refer to FIG. 8) in the apparatus width direction between the first rib 68b and the first rib 68c which are provided in the recessed portion 56c is set to be smaller than a size of a medium P of which a width in the apparatus width direction is smallest, in mediums P which can be discharged by the pair of discharging rollers 20. Here, a medium such as a name card, a card, or the like, is included as an example, in the medium P of which a width in the apparatus width direction is minimum. In addition, the disposing interval L2 is set to be smaller than a short side of a card-shaped medium, as an example. The disposing interval L3 (refer to FIG. 8) in the apparatus width direction between the first rib 68a and the first rib 68d is set to be smaller than a long side of the card-shaped medium.

As an example, in a case in which the medium P is transported and is discharged to the medium receiving tray 22, by adjusting the short side of the card-shaped medium P to the apparatus width direction in the scanner 10, the disposing interval L2 becomes the maximum disposing interval in the first rib 68, and in a case in which the medium P is transported and is discharged to the medium receiving tray 22 by adjusting the long side of the card-shaped medium to the apparatus width direction, the disposing interval L3 is set to be the maximum disposing interval in the first rib 68.

A plurality of protrusion portions 56d which protrude toward the inside are provided on an inner face in the apparatus width direction, in the side wall portion 56b, and a groove portion 56e which extends along the apparatus depth direction is provided on an outer face in the apparatus width direction. The groove portion 56e is engaged with a guide portion (not illustrated) which is provided in the lower unit 12. Due to this, the base tray 56 can move with respect to the lower unit 12 in a sliding manner.

Regarding Main Extendeding Unit

Subsequently, the main extendeding unit 58 will be described with reference to FIGS. 4 and 9. In the main extendeding unit 58, a plurality of ribs 58a which extend along the apparatus depth direction with an appropriate interval are provided on a top face side. The rib 58a is configured so that at least a part of a medium P which is discharged from the discharging port 28 is supported from a lower side in the apparatus height direction. In addition, a groove portion 58b which extends in the apparatus depth direction is formed on both end portions in the apparatus width direction in the main extendeding unit 58.

When the main extendeding unit 58 is attached to the base tray 56, a protrusion portion 56d of the base tray 56 is accommodated in the groove portion 58b. Since the protrusion portion 56d can relatively move in the apparatus depth direction in the inside of the groove portion 58b, it is possible to move the main extendeding unit 58 with respect to the base tray 56 in a sliding manner. In addition, in a state in which the main extendeding unit 58 is attached to the base tray 56, the base tray 56 covers at least a part of the main extendeding unit 58 from above.

A recessed portion 58c which is recessed downwardly is formed at a center portion in the apparatus width direction in the main extendeding unit 58. The recessed portion 56c of the base tray 56 and the recessed portion 58c of the main extendeding unit 58 are provided at a corresponding position in the apparatus width direction, in a state in which the main extendeding unit 58 is attached to the base tray 56. In addition, a rectangular space is formed when the recessed portion 56c and the recessed portion 58c are combined. The space functions as an accommodating space 70 (refer to FIG. 14) which accommodates the first sub-extendeding unit 61 and the tip end extendeding portion 62 which are attached to the main extendeding unit 58.

A second protrusion portion 72 is provided at a position which faces a center portion in the apparatus width direction at an end portion of the main extendeding unit 58 on the rear face side in the apparatus depth direction, that is, a position facing the accommodating space 70. The second protrusion portion 72 is provided with a plurality of second ribs 74 which extends along the apparatus width direction. The second rib 74 protrudes upwardly in the apparatus height direction, that is, toward the base tray 56 side. The plurality of second ribs 74 is disposed in order of ribs 74a, 74b, and 74c in line along the apparatus width direction with an appropriate interval in the apparatus width direction.

An interval 76 is provided between the second ribs 74a and 74b, and between the second ribs 74b and 74c, respectively. The interval 76 in the apparatus width direction is set to a size through which the first ribs 68b and 68c can pass the interval 76 when the main extendeding unit 58 is caused to slide in the apparatus depth direction with respect to the base tray 56. In addition, a length of the second ribs 74a and 74c in the apparatus width direction is set to be smaller than the disposing interval L1 between the first ribs 68a and 68b, and the disposing interval L1 between the first ribs 68c and 68d. A length of the second rib 74b in the apparatus width direction is set to be smaller than the disposing interval L2 between the first ribs 68b and 68c.

Here, when referring to FIG. 14, the first rib 68 protrudes toward the main extendeding unit 58 side from the base tray 56, and the second rib 74 protrudes toward the base tray 56 side from the main extendeding unit 58 in a state in which the main extendeding unit 58 is attached to the base tray 56. That is, the first rib 68 and the second rib 74 include an overlapping portion in thickness direction of the medium receiving tray 22. In addition, the first rib 68 and the second rib 74 overlap with each other in a range of a region W in the apparatus height direction. FIG. 14 schematically illustrates the medium receiving tray 22.

Regarding Regulation of Entering of Medium into Accommodating Space

A relationship between the first rib 68 and the second rib 74 will be described with reference to FIGS. 10 to 16. The sub-extendeding unit 60 is not illustrated in FIGS. 11, 13, and 16. When referring to FIGS. 10 and 11, the main extendeding unit 58 is in a state of being accommodated in the base tray 56. As illustrated in FIG. 11, the first ribs 68b and 68c enter intervals 76 between the second ribs 74a and 74b, and between the second ribs 74b and 74c, respectively.

Since the length of the second ribs 74a and 74c in the apparatus width direction is set to be smaller than the disposing interval L1 between the first ribs 68a and 68b, and the disposing interval L1 between the first ribs 68c and 68d, and the length of the second rib 74b in the apparatus width direction is set to be smaller than the disposing interval L2 between the first ribs 68b and 68c, the first rib 68 and the second rib 74 do not interfere even when the main extendeding unit 58 is moved in the apparatus depth direction with respect to the base tray 56 in a sliding manner. (refer to FIGS. 11, 13, and 16). In addition, even when the first rib 68 and the second rib 74 relatively move, an overlapping portion of the medium receiving tray 22 in the thickness direction is maintained, in the first rib 68 and the second rib 74.

Here, as illustrated in FIGS. 4, 10 and 11, there is a concern that a medium P may enter the accommodating space 70, or the back side of the accommodating space 70, when the medium P is discharged from the discharging port 28, and is bounced toward the base tray 56 side due to the stopper portion 64, in a state in which the main extendeding unit 58 is accommodated in the base tray 56, and the first sub-extendeding unit 61 and the tip end extendeding portion 62 are also accommodated in the main extendeding unit 58. However, since the first rib 68 and the second rib 74 are provided in the accommodating space 70, it is possible to prevent the medium P which is bounced from entering the accommodating space 70, or the back side of the accommodating space 70.

Subsequently, when referring to FIGS. 12 to 14, the second ribs 74a, 74b, and 74c are located on the front face side in the apparatus depth direction compared to the first ribs 68b and 68c in the apparatus depth direction, in a state in which the main extendeding unit 58 is slid to the front face side in the apparatus depth direction, and is in a half-extended state with respect to the base tray 56. In this state, the first sub-extendeding unit 61 and the tip end extendeding portion 62 enter an extended state of being pulled out to the front face side in the apparatus depth direction compared to the accommodating space 70.

Here, there is a case in which a medium P is tilted in the apparatus depth direction when being discharged from the discharging port 28, and being bounced toward the base tray 56 side due to the stopper portion 64. Even in a state in which the medium P which is bounced toward the base tray 56 side due to the stopper portion 64 is tilted in the apparatus depth direction in the half-extended state of the main extendeding unit 58, it is possible to prevent the medium P from entering inside the accommodating space 70, when at least one of the first ribs 68a and 68d is in contact with at least a part of the tilted medium P.

Since the first rib 68 and the second rib 74 have an overlapping portion in the thickness direction of the medium receiving tray 22, the second rib 74 regulates entering of the medium P in the inside of the accommodating space 70, or the back side of the accommodating space 70 in the apparatus depth direction, even when the medium P enters between the first ribs 68a and 68d in the apparatus width direction. In this manner, it is possible to regulate entering of the medium P into the accommodating space 70 using the first protrusion portion 66 (first rib 68) and the second protrusion portion 72 (second rib 74), even in a half-extended state of the main extendeding unit 58 with respect to the base tray 56.

Subsequently, when referring to FIGS. 15 and 16, the second ribs 74a, 74b, and 74c are located at the front face side in the apparatus depth direction compared to a state illustrated in FIG. 13, in a state in which the main extendeding unit 58 is further slid to the front face side in the apparatus depth direction with respect to the base tray 56, and is fully extended.

Even in the fully extended state of the main extendeding unit 58, at least one of the first ribs 68a and 68d is in contact with at least a part of the medium P, and can suppress entering of the medium P into the accommodating space 70, when the medium P is discharged from the discharging port 28, and is bounced toward the base tray 56 side due to the stopper portion 64.

In addition, since the second ribs 74a, 74b, and 74c are located on the front face side in the apparatus depth direction, even when a medium P enters between the first ribs 68a and 68d in the apparatus width direction, it is possible for the second rib 74 to more reliably regulate entering of the medium P into the accommodating space 70, or the back side of the accommodating space 70, in the apparatus depth direction.

Here, since the first rib 68 and the second rib 74 have an overlapping portion in the thickness direction of the medium receiving tray 22, and the first rib 68 and the second rib 74 can relatively move without interfering with each other in the apparatus depth direction, overlapping between the first rib 68 and the second rib 74 is maintained regardless of an extended position of the main extendeding unit 58 with respect to the base tray 56. In this manner, it is possible to regulate entering of a medium P into the accommodating space 70, or the back side of the accommodating space 70 in both of the half-extended state and the fully-extended state of the main extendeding unit 58.

Regarding a Stopper Portion

Subsequently, the stopper portion 64 will be described with reference to FIGS. 17 to 19. The stopper portion 64 is provided with a slider 78, and a stopper 80. The slider 78 is configured so as to slide along in the apparatus depth direction with respect to the medium receiving face 62a of the tip end extendeding portion 62.

The stopper portion 64 is attached to the tip end extendeding portion 62. When referring to FIGS. 17 and 18, the stopper 80 is rotatably attached to the slider 78. As an example, as illustrated in FIG. 17, the stopper 80 can be switched between an accommodated posture as a posture which goes along the medium receiving face 62a and a regulating posture which regulates jumping out of a medium P by forming a face intersecting the medium receiving face 62a.

Regarding Modification Example of Stopper Portion

A modification example of the stopper portion 64 will be described with reference to FIGS. 20 and 21. A plurality of recessed portions 82 are formed on the medium receiving face 62a along the apparatus depth direction with an appropriate interval. The stopper 80 is rotatably attached to the slider 78 using a rotating shaft 84 as a fulcrum. In addition, a protrusion portion 86 which can engage with any one of the plurality of recessed portions 82 is formed on an opposite side by interposing the rotating shaft 84, in the stopper 80.

As illustrated in FIG. 21, when the stopper 80 is switched from the accommodated posture (refer to FIG. 17) to the regulating posture, the protrusion portion 86 engages with at least one of the plurality of recessed portions 82. In this manner, the slider 78 cannot slide on the medium receiving face 62a, and enters a locked state. Accordingly, since the stopper portion 64 is in a locked state with respect to the tip end extendeding portion 62, even a medium P discharged from the discharging port 28 bumps into the stopper 80 with great force, it is possible to suppress a positional deviation of the stopper portion 64, and reliably accommodate the medium on the medium receiving face 62a by stopping thereof.

Meanwhile, when causing the stopper 80 which takes a regulating posture to rotate on the medium receiving face 62a side using the rotating shaft 84 as a fulcrum, the protrusion portion 86 rotates in a direction separating from the medium receiving face 62a, and engaged state with the recessed portion 82 is released. As a result, the locked state of the slider 78 is released, and the slide can move in a sliding manner in the apparatus depth direction on the medium receiving face 62a.

Modification Example of First Embodiment

It is set to a configuration in which the first protrusion portion 66 is provided with the plurality of first ribs 68 which extend in the apparatus depth direction, and the second protrusion portion 72 is provided with the plurality of second ribs 74 which extend in the apparatus width direction; however, a configuration in which the first protrusion portion 66 is provided with the plurality of second ribs 74, and the second protrusion portion 72 is provided with the plurality of first ribs 68 may be adopted, instead of the configuration.

Second Embodiment

A second embodiment which is a medium discharging device 88 will be described with reference to FIG. 22. FIG. 22 schematically illustrates the medium discharging device 88 in the second embodiment. The medium discharging device 88 in the second embodiment is different from the first embodiment in a point that an accommodated posture and a regulating posture of a stopper 90a of a stopper portion 90 is switched according to a length of a medium P which is discharged in a discharging direction. In addition, a medium receiving tray 92 is illustrated using two tray members by simplifying a configuration thereof in FIG. 22; however, it may be configured of two or more tray members, and may be configured of the base tray 56, the main extendeding unit 58, the first sub-extendeding unit 61, and the tip end extendeding portion 62, similarly to the first embodiment.

The medium discharging device 88 illustrated in FIG. 22 is provided with the medium receiving tray 92, and a switching unit 94 which switches a posture of the stopper 90a of the stopper portion 90.

The medium receiving tray 92 is configured of a tray member 92a and a tray member 92b, as an example. The tray member 92a can slide with respect to the lower unit 12, and can be switched between an accommodated state and an extended state. The tray member 92b can slide with respect to the tray member 92a, and can be switched between an accommodated state and an extended state. In addition, the stopper portion 90 is attached to a tip end side in the apparatus depth direction of the tray member 92b.

The switching unit 94 is provided with a driving motor 96 which is provided in the lower unit 12, a driving pulley 98, a transmission pulley 100, a driven pulley 102, and driving belts 104 and 106, as an example. The driving pulley 98 is attached to a driving shaft of the driving motor 96, and is rotatably driven by the driving motor 96. The driving belt 104 is hung over the driving pulley 98 and the transmission pulley 100. The driven pulley 102 is attached to a rotating shaft of the stopper 90a. The driving belt 106 is hung over the transmission pulley 100 and the driven pulley 102.

By rotating the driving motor 96 in a normal rotation direction or a reverse rotation direction, it is possible to transmit a rotation driving power of the driving motor 96 to the driven pulley 102 through the driving pulley 98, the driving belt 104, the transmission pulley 100, and the driving belt 106, and switch the stopper 90a from a regulating posture to an accommodated posture, or from the accommodated posture to the regulating posture. A dashed line in FIG. 22 denotes an accommodated state of the stopper 90a. In addition, in FIG. 22, as an example, the stopper 90a is pulled down on the downstream side in a discharging direction of a medium P; however, the stopper may be pushed down on the upstream side in the discharging direction.

The control unit 54 switches the stopper 90a from a regulating posture to an accommodated posture by driving the driving motor 96 in a case in which a tip end of a medium P which is discharged goes over a position of the stopper 90a of the stopper portion 90, when the medium P is discharged to the medium receiving tray 92, based on size information of the medium P which is discharged. In this manner, it is possible to avoid a situation in which the stopper portion 90 interferes with discharging of a medium P, in a case in which the medium P is long in a discharging direction. In addition, size information of a medium P which is discharged may also be obtained from a detecting signal of the medium P using a medium detecting sensor (not illustrated) which is provided in the scanner 10, not only from driver information which is input to the control unit 54.

Third Embodiment

Subsequently, a third embodiment which is a medium discharging device 108 will be described with reference to FIGS. 23 and 24. FIGS. 23 and 24 schematically illustrate the medium discharging device 108 of the third embodiment. The medium discharging device 108 of the third embodiment is different from the first embodiment in a point that a locking mechanism which locks a medium receiving tray 110 to an accommodated state with respect to the scanner 10 is provided.

A stopper portion 112 is provided with a stopper 114, a slider 116, a locking pin 118 as a "locking unit", and an urging unit 120. The stopper 114 is rotatably attached to the slider 116 using a rotating shaft 122 as a fulcrum, and can be switched between a regulating posture and an accommodated posture. In addition, the stopper 114 is provided with an engaging portion 124 which can be engaged with the locking pin 118. The urging unit 120 is configured as a tension spring, as an example, and one end thereof is connected to the slider 116, and the other end is connected to the locking pin 118. In addition, the urging unit 120 urges the locking pin 118 toward the slider 116 side.

A hole portion 12a in which the locking pin 118 can be accommodated is provided in the lower unit 12 which is a "housing".

When referring to FIG. 23, the base tray 56 is accommodated in the lower unit 12 in a state in which the main extendeding unit 58 and the sub-extendeding unit 60 are accommodated, respectively. When setting the stopper 114 of the stopper portion 112 to an accommodated state in this state, the engaging portion 124 presses the locking pin 118 toward the lower unit 12 side against an urging force of the urging unit 120. In addition, the locking pin 118 enters a state of entering inside the hole portion 12a of the lower unit 12 through the base tray 56, the main extendeding unit 58, and the sub-extendeding unit 60. In this state, the base tray 56, the main extendeding unit 58, and the sub-extendeding unit 60 are locked to the lower unit 12 through the locking pin 118. For this reason, it is possible to suppress careless jumping out of the medium receiving tray 110 from the scanner 10.

Subsequently, when referring to FIG. 23, the stopper 114 in the accommodated state is switched to a regulating posture by being rotated with respect to the slider 116. Due to the rotating, the engaging portion 124 also rotates using the rotating shaft 122 as a fulcrum in a clockwise direction in FIG. 23. In addition, due to an urging force of the urging unit 120, the locking pin 118 displaces in a direction of being extracted from the hole portion 12a. As a result, a locking state of the base tray 56, the main extendeding unit 58, and the sub-extendeding unit 60 with respect to the lower unit 12 is released, and it is possible to pull out the medium receiving tray 110 from the scanner 10.

When summarizing the above descriptions, the medium discharging devices 18, 88, and 108 are provided with the pair of discharging rollers 20 which discharges a medium P, and the medium receiving trays 22, 92, and 110 which accommodate the medium P discharged by the pair of discharging rollers 20, and can be switched between the extended state and the accommodated state, the medium receiving trays 22, 92, and 110 are provided with the base tray 56, the main extendeding unit 58 which is located on the front face side in the apparatus depth direction as the medium discharging direction side, compared to the base tray 56 in the extended state, and which can be accommodated or extended, and at least one sub-extendeding unit 60 which is located on the front face side in the apparatus depth direction as the medium discharging direction side compared to the main extendeding unit 58 in the extended state, and can be accommodated or extended, and in the base tray 56, the accommodating space 70 for accommodating at least one sub-extendeding unit 60 is formed, and the first protrusion portion 66 which protrudes toward the accommodating space 70 is provided.

According to the above configuration, since the medium receiving trays 22, 92, and 110 which can be switched between the extended state and the accommodated state are provided with the base tray 56, the main extendeding unit 58, and the sub-extendeding unit 60, and the accommodating space 70 for accommodating at least one sub-extendeding unit 60 is formed in the base tray 56, when the sub-extendeding unit 60 is extended, there is a concern that a medium P which is discharged may enter the accommodating space 70, or the back side of the accommodating space 70. However, in the configuration, since the first protrusion portion 66 which protrudes toward the accommodating space 70 is formed in the accommodating space 70 in the base tray 56, entering of a medium in to the accommodating space 70, or the back side of the accommodating space 70 can be regulated by the first protrusion portion 66.

The second protrusion portion 72 which protrudes to the accommodating space 70, and has a portion overlapping with the first protrusion portion 66 in the thickness direction of the medium receiving tray 22 is provided at a position facing the accommodating space 70 in the main extendeding unit 58, and overlapping of the first protrusion portion 66 and the second protrusion portion 72 is maintained regardless of an extending position of the main extendeding unit 58. According to the configuration, it is possible to regulate entering of a medium P into the accommodating space 70 or the back side of the accommodating space 70, even in a state in which the main extendeding unit 58 is in a half-extended state, not only in a fully extended state. As described above, it is possible to provide medium discharging devices 18, 88, and 108 in which it is possible to reliably avoid entering of a medium P into the accommodating space 70 or the back side of the accommodating space 70.

Any one of the first protrusion portion 66 and the second protrusion portion 72 is configured of the first rib 68 which extends in the apparatus depth direction as the medium discharging direction, and the other thereof is configured of the second rib 74 which extends in the apparatus width direction as a direction intersecting the medium discharging direction. According to the configuration, it is possible to more reliably suppress entering of a medium P into the accommodating space 70 or the back side of the accommodating space 70.

A plurality of the first ribs 68 are provided with an appropriate interval in the apparatus width direction as the direction intersecting the medium discharging direction, and the maximum disposing interval L2 or L3 in the plurality of first ribs 68 is smaller than a size of a medium of which a size in the medium width direction as a direction intersecting the medium discharging direction is smallest, in mediums P which can be discharged by the pair of discharging rollers 20. According to the configuration, it is possible to preferably regulate entering of a medium P into the accommodating space 70, or the back side of the accommodating space 70, regardless of a size of the medium P.

The sub-extendeding unit 60 is configured of the tip end extendeding portion 62 which is located at the lowest portion in the medium discharging direction in the extended state, that is, on the front face side in the apparatus depth direction, and the stopper portions 64, 90, and 112 which can slide with respect to the tip end extendeding portion 62, and can be switched between the regulating posture which regulates jumping out of a medium P by forming a face intersecting the medium receiving face 62a by rotating and the accommodated posture as a posture which goes along the medium receiving face 62a. According to the configuration, it is possible to suppress jumping out of the medium P from the medium receiving trays 22, 92, and 110 when discharging the medium P using the stoppers 80, 90a, and 114.

The plurality of recessed portions 82 are formed in the tip end extendeding portion 62 along the sliding direction of the stopper portion 64, and the protrusion portion 86 which enters the recessed portion 82 when switching the stopper portion 64 from the accommodated posture to the regulating posture is formed in the stopper portion 64. According to the configuration, it is possible to reliably hold the stopper portion 64 a desired position using engaging between the recessed portion 82 and the protrusion portion 86. In particular, it is possible to suppress a positional deviation of the stopper portion 64 which occurs when a medium P which is discharged presses the stopper portion 64.

The switching unit 94 which switches a posture of the stopper portion 90, and the control unit 54 which controls the switching unit 94 are provided, and the control unit 54 pushes down the stopper 90a of the stopper portion 90 on the upstream side or the downstream side in the medium discharging direction from the regulating posture, in a case in which a tip end of a medium P which is discharged goes over a position of the stopper portion 90 when being discharged to the medium receiving tray 92, based on size information of the medium P which is discharged. According to the configuration, it is possible to avoid a problem in which the stopper portion 90 interrupts discharging of a long medium P when the long medium is discharged.

The base tray 56 can be accommodated or extended with respect to the lower unit 12 which configures a housing of the medium discharging device 108, the base tray 56, the main extendeding unit 58, and the sub-extendeding unit 60 are locked so as to be accommodated, by switching the stopper portion 112 from the regulating posture to the accommodated posture, and the locking pin 118 which release locking by switching the stopper portion 112 from the accommodated posture to the regulating posture is provided. According to the configuration, it is possible to avoid a problem in which the medium receiving tray 110 is unintendedly extended when carrying the scanner 10, for example. In addition, since the locking pin 118 is operated by the stopper portion 112, it is not necessary to provide an exclusive operating member, and it is possible to suppress rise in cost of the apparatus.

The scanner 10 is provided with the image reading unit 36 which reads a face of a medium P, and medium discharging devices 18, 88, and 108 which are provided on the downstream side of the image reading unit 36 in the medium transport direction.

The entire disclosure of Japanese Patent Application No. 2016-129754, filed Jun. 30, 2016 is expressly incorporated by reference herein.

What is claimed is:

1. A medium discharging device comprising:
a discharging unit that discharges a medium toward a medium discharging direction in which a medium is discharged; and
a medium receiving tray that receives a medium discharged by the discharging unit, and is switched between an extended state and an accommodated state,
wherein the medium receiving tray includes
a base tray,
a main extendeding unit that is located on a medium discharging direction side compared to the base tray in an extended state, and is accommodated or extended, and
at least one sub-extendeding unit that is located on the medium discharging direction side, compared to the main extendeding unit in an extended state, and is accommodated or extended, and
wherein the base tray forms an accommodating space for accommodating at least the one sub-extendeding unit, the base tray being provided with a first protrusion portion protruding toward the accommodating space,
wherein the main extendeding unit includes a second protrusion portion which is provided at a position facing the accommodating space, protrudes to the accommodating space, and includes a portion overlapping with the first protrusion portion in a thickness direction of the receiving tray, and
wherein the overlapping portion is maintained regardless of an extended position of the main extendeding unit.

2. The medium discharging device according to claim 1, wherein one of the first protrusion portion and the second protrusion portion is configured of a first rib which extends in the medium discharging direction, and wherein the other one of the first protrusion portion and the second protrusion portion is configured of a second rib which extends in a direction intersecting the medium discharging direction.

3. The medium discharging device according to claim 2, wherein the first rib includes a plurality of first ribs provided in the direction intersecting the medium discharging direction with an interval, and
wherein a maximum disposing interval between the plurality of first ribs is smaller than a size of a medium, the size of which is smallest in a medium width direction intersecting the medium discharging direction, in mediums discharged by the discharging unit.

4. The medium discharging device according to claim 1, wherein the sub-extendeding unit includes
a tip end extendeding portion located on the most tip end in the medium discharging direction in an extended state, and
a stopper portion slidable with respect to the tip end extendeding portion, and is switched between a regulating posture and an accommodated posture along the medium receiving face, the regulating posture being a posture in which jumping out of a medium is regulated by the stopper portion rotating to form a face intersecting a medium receiving face.

5. The medium discharging device according to claim 4, wherein a plurality of recessed portions are formed in the tip end extendeding portion in a sliding direction of the stopper portion, and
wherein a protrusion portion is formed in the stopper portion, the protrusion portion entering one of the recessed portions when the stopper portion is switched from the accommodated posture to the regulating posture.

6. The medium discharging device according to claim 4, further comprising:
a switching unit switching postures of the stopper portion; and
a control unit controlling the switching unit,
wherein the control unit pushes down the stopper portion on an upstream side or a downstream side in the medium discharging direction from the regulating posture based on size information of a discharged medium, in a case in which a tip end of the discharged medium passes over a position of the stopper portion when the medium is discharged to the medium receiving tray.

7. The medium discharging device according to claim 4, wherein the base tray is accommodated or extended with respect to a housing of the medium discharging device, and
wherein a locking unit is provided that locks the base tray, the main extendeding unit, and the sub-extendeding unit to an accommodated state by the stopper portion being switched from the regulating posture to the accommodated posture, and releases the locking by the stopper portion being switched from the accommodated posture to the regulating posture.

8. An image reading apparatus comprising:
a reading unit that reads a face of a medium; and
the medium discharging device according to claim 1 that is provided on a downstream side of the reading unit in a medium transport direction.

9. A medium discharging device comprising:
a discharging unit that discharges a medium toward a medium discharging direction in which a medium is discharged; and
a medium receiving tray that receives a medium discharged by the discharging unit, and is switched between an extended state and an accommodated state,
wherein the medium receiving tray includes
a base tray,
a main extendeding unit that is located on a medium discharging direction side compared to the base tray in an extended state, and is accommodated or extended from the base tray by being slidable in relation to the base tray, and
at least one sub-extendeding unit that is located on the medium discharging direction side, compared to the main extendeding unit in an extended state, and is accommodated or extended from the main extending unit by being slideable in relation to the main extendeding unit, and
wherein the base tray forms an accommodating space for accommodating at least the one sub-extendeding unit, the base tray being provided with a first protrusion portion protruding toward the accommodating space.

* * * * *